(12) United States Patent
Liu et al.

(10) Patent No.: US 7,184,421 B1
(45) Date of Patent: Feb. 27, 2007

(54) METHOD AND APPARATUS FOR ON DEMAND MULTICAST AND UNICAST USING CONTROLLED FLOOD MULTICAST COMMUNICATIONS

(75) Inventors: Yu-Jih Liu, Ledgewood, NJ (US); Joseph John Visvader, Riverdale, NJ (US); Jon William Schnabel, Nutley, NJ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 1026 days.

(21) Appl. No.: 10/024,146

(22) Filed: Dec. 21, 2001

(51) Int. Cl.
*H04Q 7/24* (2006.01)
(52) U.S. Cl. .................. 370/338; 370/254; 370/400
(58) Field of Classification Search ........ 370/254–258, 370/328, 338, 229–235, 400–411
See application file for complete search history.

(56) References Cited

U.S. PATENT DOCUMENTS

| | | | |
|---|---|---|---|
| 5,007,052 A * | 4/1991 | Flammer | 370/389 |
| 5,056,085 A * | 10/1991 | Vu | 370/400 |
| 6,130,881 A | 10/2000 | Stiller et al. | |
| 6,205,146 B1 | 3/2001 | Rochberger et al. | |
| 6,260,072 B1 | 7/2001 | Rodriguez-Moral | |
| 6,304,556 B1 | 10/2001 | Haas | |
| 6,370,571 B1 | 4/2002 | Medin, Jr. | |
| 6,456,599 B1 | 9/2002 | Elliott | |
| 6,535,498 B1 * | 3/2003 | Larsson et al. | 370/338 |
| 6,704,293 B1 * | 3/2004 | Larsson et al. | 370/255 |
| 2001/0034793 A1 | 10/2001 | Madruga et al. | |
| 2003/0165117 A1 | 9/2003 | Garcia-Luna-Aceves et al. | |

FOREIGN PATENT DOCUMENTS

EP  0 461 279 A1  12/1991

OTHER PUBLICATIONS

Pagani, E. et al.; "An On-Demand Shared Tree with Hybrid State for Multicast Routing in Ad Hoc Mobile Wireless Networks"; IEEE 1999; 6 pages.
Toh, C-K. et al.; "ABAM: On-Demand Associativity-Based Multicast Routing for Ad Hoc Mobile Networks"; VTC, IEEE 2000; 7 pages.
Devarapalli, V. et al.; "MZR: A Multicast Protocol for Mobile Ad Hoc Networks"; IEEE 2001; 6 pages.
Adjih, C. et al.; "Link State Routing in Wireless Ad-Hoc Network"; MILCOM Proceedings; Oct. 2003; pp. 1-6.
Henderson, T.R. et al.; "A Wireless Interface Type for OSPF"; MILCOM Proceedings; Oct. 2003; pp. 1-6.
Cain, J.B. et al.; "A Link Scheduling and Ad Hoc Networking Approach Using Direction Antennas"; MILCOM Proceedings; Oct. 2003; pp. 1-6.
Macker, J.P. et al.; "A Study of Link State Flooding Optimizations for Scaleable Wireless Networks"; MILCOM Proceedings; Oct. 2003; pp. 1-6.
Hsu, J. et al.; "Performance of Mobile Ad Hoc Networking Routing Protocols in Realistic Scenarios"; MILCOM Proceedings; Oct. 2003; pp. 1-6.
Clausen, T. et al.; "Optimized Link State Routing Protocol (OLSR)"; Internet RFC/STD/FYI/BCP Archives; Project Hipercom, INRIA; Oct. 2003; 75 pages.
Qayyum, A. et al.; "Multipoint relaying: An efficient technique for flood in mobile wireless networks"; Mar. 2000; 18 pages.
Clausen, T. et al.; "Optimized Link State Routing Protocol"; Internet Draft; Jul. 1, 2002; 55 pages.
Jacquet, P. et al.; "Increasing Reliability in Cable-Free Radio LANs Low Level Forwarding in HIPERLAN"; Wireless Personal Communications, vol. 4, 1996; pp. 51-63.
Corson, M.S. et al.; "An Internet MANET Encapsulation Protocol (IMEP) Specification"; Internet Draft; Aug. 7, 1999; 37 pages.
Jacquet, P. et al.; "Optimized Link State Routing Protocol for Ad Hoc Networks"; Hipercom Project, INRIA; 2001 IEEE; pp. 62-68.
European Telecommunication Standard; Radio Equipment and Systems (RES); High Performance Radio Local Area Network (HIPERLAN) Type 1; Functional spceification; ETSI; Oct. 1996; pp. 1-111.
Viennot, L.; "Complexity Results on election of Multipoint Relays in Wireless Network"; INRIA; Dec. 1998; pp. 1-12.
Jacquet, P. et al.; "Optimized Link State Routing Protocol"; Internet Draft; Nov. 18, 1998; 17 pages.
Corson, M.S.; "An Internet MANET Encapsulation Protocol (IMEP) Specification"; Internet Draft; Nov. 26, 1997; 18 pages.
David B. Johnson & David A. Maltz; Dynamic Source Routing in Ad Hoc Wireless Networks; Mobile Computing, 1996, pp. 1-18.
David B. Johnson, David A. Maltz, Yih-Chun Hu & Jorjeta G. Jetcheva; IETF Magnet Working Group; The Dynamic Source Routing Protocol for Mobile Ad-Hoc Networks; Mar. 2, 2001; pp. 1-59.
V. Park, et al; IETF MANET Working Group; Temproally-Ordered Routing Algorithm (TORA) Version 1 Functional Specification; Jul. 20, 2001; pp. 1-23.
Charles E. Perkins, Elizabeth M. Royer & Samir R. Das; IETF Mobile Ad Hoc Networking Group; Ad Hoc On-Demand Distance Vector (AODV) Routing; Mar. 2, 2001; pp. 1-25.

(Continued)

*Primary Examiner*—Chi Pham
*Assistant Examiner*—Phuc Tran
(74) *Attorney, Agent, or Firm*—Edell, Shapiro & Finnan, LLC

(57) ABSTRACT

Network configuration hierarchy information is maintained using flexible mechanisms and methods for establishing routes and transferring information between nodes in ad-hoc data communication networks using on-demand multicast and unicast techniques. Communication nodes use network topology information to build and maintain a dynamically mobile, wireless, ad-hoc network capable of efficiently routing both unicast and multicast traffic. Network nodes that facilitate the collection and distribution of network topology and routing data are dynamically selected, configured, and maintained. Network traffic overhead necessary for maintaining and distributing network routing table information is held to a minimum and efficiently distributed across the network, thereby reducing the potential for network traffic bottlenecks due to network overhead processes.

31 Claims, 22 Drawing Sheets

OTHER PUBLICATIONS

L. Wei, et al.; IETF Networking Working Group; Protocol Independent Multicast Version 2, Dense Mode Specification; May 21, 1997; pp. 1-12.

J.J. Garcia-Luna-Aceves, Marcello Spohn & David Beyer; IETF Magnet Working Group; Source Tree Adaptive Routing (STAR) Protocol; Oct. 22, 1999; pp. 1-23.

C.W. Wu, Y.C. Tay & C-K Toh; IETF Manet Working Group; Ad Hoc Multicast Routing Protocol Utilizing Increasing Id-Numbers (AMRIS) Functional Specification; Nov. 24, 1998; pp. 1-20.

A. Ballardei; IETF Network Working Group; Core based Trees (CBT Version 2) Multicast Routing; Sep. 1997; pp. 1-17.

Tony Ballardie, Paul Francis & Jon Crowcroft; Sigcomm '93; Core Based Trees (CBT) An Architecture for Scalable Inter-Domain Multicast Routing; Sep. 1993; pp. 85-94.

Ching-Chuan Mario Gerla & Lixia Zhang; Computer Science Department, University of California, Los Angeles; Shared Tree Wireless Network Multicast*; Apr. 1997; pp. 1-16.

Ching-Chuan, Mario Gerla & Lixia Zhang; Computer Science Department, University of California, Los Angeles; Forwarding Group Multicast Protocol (FGMP) for Multihop, Mobile Wireless Networks; ACM-Baltzer Journal of Cluster Computing, 1998; pp. 1-16.

Sung-Ju Lee, William Su, & Mario Gerla; IETF Manet Working Group; On-Demand Multicast Routing Protocol (ODMRP) for Ad Hoc Networks; Jan. 2000; pp. 1-29.

Yu-Jih Liu; U.S. Appl. No. 09/709,502; filed Nov. 13, 2000; pp. 1-46 and 10 pages of drawings.

* cited by examiner

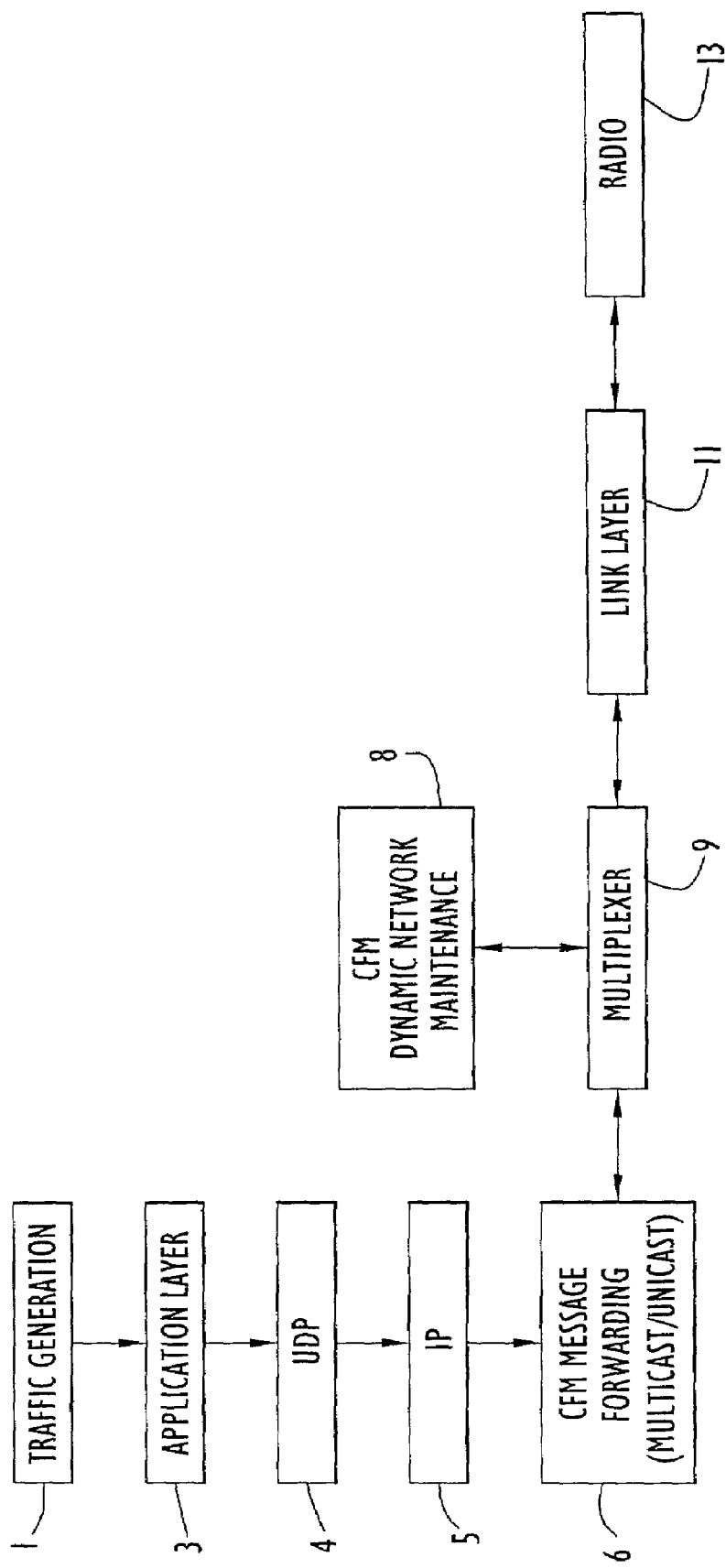

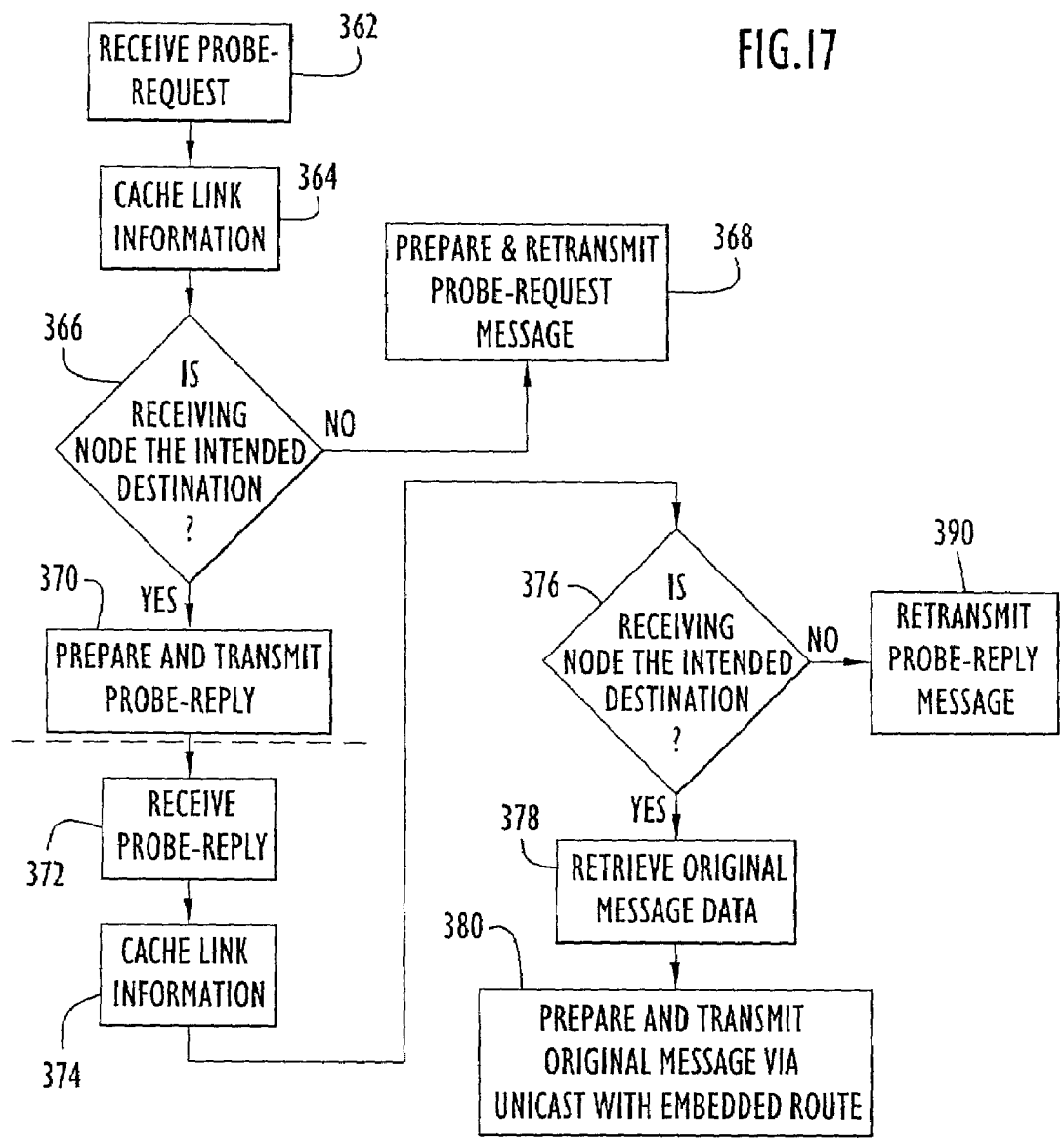

METHOD AND APPARATUS FOR ON DEMAND MULTICAST AND UNICAST USING CONTROLLED FLOOD MULTICAST COMMUNICATIONS

BACKGROUND OF THE INVENTION

1. Field of the Invention

The invention relates to data communication networks. More particularly, it relates to maintaining network configuration hierarchy information and flexible mechanisms for establishing routes and transferring information between nodes in ad-hoc data communication networks using on-demand multicast and unicast techniques.

2. Description of the Related Art

In stationary network communication environments, network configuration hierarchy information and statically defined or dynamically discovered network routing information can be used virtually forever because the nodes do not move. Therefore, the network overhead for most protocols is very small in stationary environments and the network is expected to perform well. However, in mobile ad-hoc networks, nodes may move in a random fashion causing routes to change in an unpredictable manner. Under such conditions, the same protocols will require significant overhead traffic to discover new routes and to maintain the network routing infrastructure. Depending upon the traffic, the number of nodes and the specific nature of a particular protocol, the overhead traffic could increase significantly in an ad-hoc network and degrade network performance.

Generally, there are two types of network traffic, each type characterized by the number of destinations to which the traffic must be routed. Unicast traffic is routed from a single source to a single destination. Multicast traffic is routed from a single source to multiple destinations.

Representative on-demand unicast techniques include Dynamic Source Routing (DSR), Temporally-Ordered Routing Algorithm (TORA), and Ad-Hoc On Demand Distance Vector (AODV). Each of these unicast techniques is based upon a similar concept. If the source does not know a route to the destination, a broadcast message is sent out to search for the destination. After receiving this broadcast message, the destination issues a reply that enables the source to identify the route. For DSR, an entire route is carried in the message being transmitted. For TORA, multiple routes to a destination are maintained and a selected route is not necessarily optimized to reduce overhead traffic. For AODV, every node knows only the next hop required to move the message one hop closer to its designated destination and not the entire route.

Representative on-demand multicast techniques include source tree multicast (e.g., Source Tree Adaptive Routing (STAR), Protocol Independent Multicast (PIM)), Core Based Tree (CBT) and On-Demand Multicast Routing Protocol (ODMRP). Each of these multicast techniques is also based upon a similar concept. That is, routing tables are built and maintained and used to route traffic from the nodes upon which the routing tables reside. In source tree multicast (e.g., STAR and PIM), every node maintains a tree capable of routing messages to their respective destinations within a minimum number of hops. For CBT, a single tree is created at a topographically central node referred to as a rendezvous point (RP) node and the RP node is used to route all multicast traffic in the network. For ODMRP, multicast groups are defined for messages of similar type and/or content. Each multicast group is associated with a Forwarding Group consisting of designated nodes within the network that forward multicast traffic associated with their assigned message groups.

As previously discussed, in stationary environments, the network overhead for maintaining DSR, TORA or AODV routes is very small and the network can be expected to perform well. However, in mobile ad-hoc networks, these same protocols require significant overhead traffic to discover new routes and to maintain the network routing infrastructure. Depending upon the traffic and the number of nodes, the overhead traffic could increase significantly and degrade network performance.

Conventional on-demand techniques often broadcast messages that identify a destination node but do not specify a specific path from the source to the destination node. Any node that receives such a broadcast message broadcasts the message again. This technique, referred to as "flooding" a message, is inefficient in the sense that it is unnecessary for every node to forward the broadcast message in order to achieve full coverage of the network. Many nodes receive the same message multiple times and simply discard it. Even though the scope of a flooded message can be restricted, prior methods for limiting such floods have failed to achieve sufficient efficiency. For example, conventional methods that establish a maximum limit on the number of times a message may be rebroadcast might not be efficient, for network topologies are often asymmetrical and it is difficult to choose an efficient rebroadcast value for use across the entire network. Further, such information often is not available.

For multicast techniques, the problem of maintaining routes is even more serious due to the fact that each message can have multiple destinations and that each node can join many different multicast groups. Furthermore, many multicast protocols create a tree or Forwarding Group for each multicast group, thereby increasing network overhead as the number of multicast groups increase. Ideally, the network overhead should be independent of the number of multicast groups. In large Forwarding Group (FG) networks, movement of network nodes can result in a high rate of tree branch repairs and a significant number of FG node changes. In source tree based routing in which every source maintains a routing table, network maintenance requirements are even worse. In CBT networks, in which only a single tree is maintained, network maintenance requirements are less than in source tree based networks but are still significantly increased by network node movement. These increased maintenance overhead requirements are further exacerbated by other CBT network traffic flow inefficiencies, such as the need in CBT for all messages to be routed through a single CBT rendezvous point.

Accordingly, there are needed techniques for efficiently routing both multicast and unicast messages in communications networks of mobile communications nodes, without excessive retransmission of messages and without having to route all messages through a single node.

SUMMARY OF THE INVENTION

The present invention solves these problems with new techniques that use network topology information to build and maintain a dynamically mobile, wireless, ad-hoc network capable of efficiently routing both unicast and multicast traffic. According to certain aspects of these new techniques, network nodes that facilitate the collection and distribution of network topology and routing data are dynamically selected, configured, and maintained. Network traffic overhead necessary for maintaining and distributing network routing table information is held to a minimum and efficiently distributed across the network, thereby reducing the potential for network traffic bottlenecks due to network overhead processes.

Therefore, in light of the above, and for other reasons that will become apparent when the invention is fully described, an object of the present invention is to efficiently route both unicast and multicast messages in a wireless, ad-hoc network wherein all or a portion of the network nodes may be dynamically mobile with respect to direction, rate of travel, and relative proximity to other nodes.

Another object of the invention is to reduce network overhead associated with the creation and maintenance of centralized network routing tables and distributed node level routing information used to route both unicast and multicast data in a dynamically mobile, wireless, ad-hoc network.

Still another object of the invention is to optimize the dynamic selection and configuration of nodes used to facilitate the creation, distribution and use of network routing information.

Yet another object of the invention is to reduce network overhead associated with flooding messages across a network by limiting message rebroadcasts based upon network topology.

Still yet another object of the invention is to facilitate the delivery of large unicast messages by employing controlled flood techniques, upon detection of a failed message route.

A further object of the invention is to efficiently discover discrete routes between network nodes through the use of controlled flood techniques.

A still further object of the invention is to dynamically maintain link cache information within the respective network nodes without introducing additional network traffic load by monitoring path information contained in throughput traffic.

Yet a further object of the invention is to facilitate the integration of the described techniques for establishing and maintaining a dynamically mobile, wireless, ad-hoc network with traditional hierarchical multi-tiered network architectures.

The aforesaid objects are achieved individually and in combination, and it is not intended that the invention be construed as requiring two or more of the objects to be combined unless expressly required by the claims attached hereto.

In accordance with the certain aspects of the invention, network configuration hierarchy information is established and maintained using flexible mechanisms and methods for establishing routes and transferring information between nodes in ad-hoc data communication networks using on-demand multicast and unicast techniques. Communication nodes use network topology information to build and maintain a dynamically mobile, wireless, ad-hoc network capable of efficiently routing both unicast and multicast traffic. Network nodes that facilitate the collection and distribution of network topology and routing data are dynamically selected, configured, and maintained. Network traffic overhead necessary for maintaining and distributing network routing table information is held to a minimum and efficiently distributed across the network, thereby reducing the potential for network traffic bottlenecks due to network overhead processes.

The new on-demand routing techniques described herein are referred to collectively as Controlled Flood Multicast (CFM). CFM techniques are designed to distribute both unicast and multicast traffic in dynamically mobile, wireless, ad-hoc networks. A first set of techniques, efficiently collects and uses network topology information to build and dynamically maintain a mobile, wireless, ad-hoc network. A second set of techniques uses new on-demand routing methods to distribute both unicast and multicast traffic within the dynamically maintained network.

To route multicast traffic, a CFM communication node uses a controlled-flood technique to dynamically determine whether it should rebroadcast a flooded message based upon the present state of internally maintained network topology information. In this manner, the controlled flood technique dynamically adapts to changing mobility conditions. For unicast traffic, autonomous CFM nodes make intelligent routing decisions based upon a tiered hierarchy of locally maintained network topology information. If an individual node is unable to locate a path to a designated destination based upon its locally maintained information, the message can be routed within a minimum number of hops to a node that can. In this manner CFM network maintenance and routing overhead is distributed across the network.

The above and still further objects, features and advantages of the invention will become apparent upon consideration of the following descriptions and descriptive figures of specific embodiments thereof. While these descriptions go into specific details of the invention, it should be understood that variations may and do exist and would be apparent to those skilled in the art based on the descriptions herein.

BRIEF DESCRIPTION OF THE DRAWINGS

FIG. 2A presents an exemplary representation of the CFM system architecture.

FIG. 17 presents a flowchart illustrating an embodiment of a representative CFM approach for processing a PROBE-REQUEST or PROBE-REPLY message.

DETAILED DESCRIPTION

Figure 1:
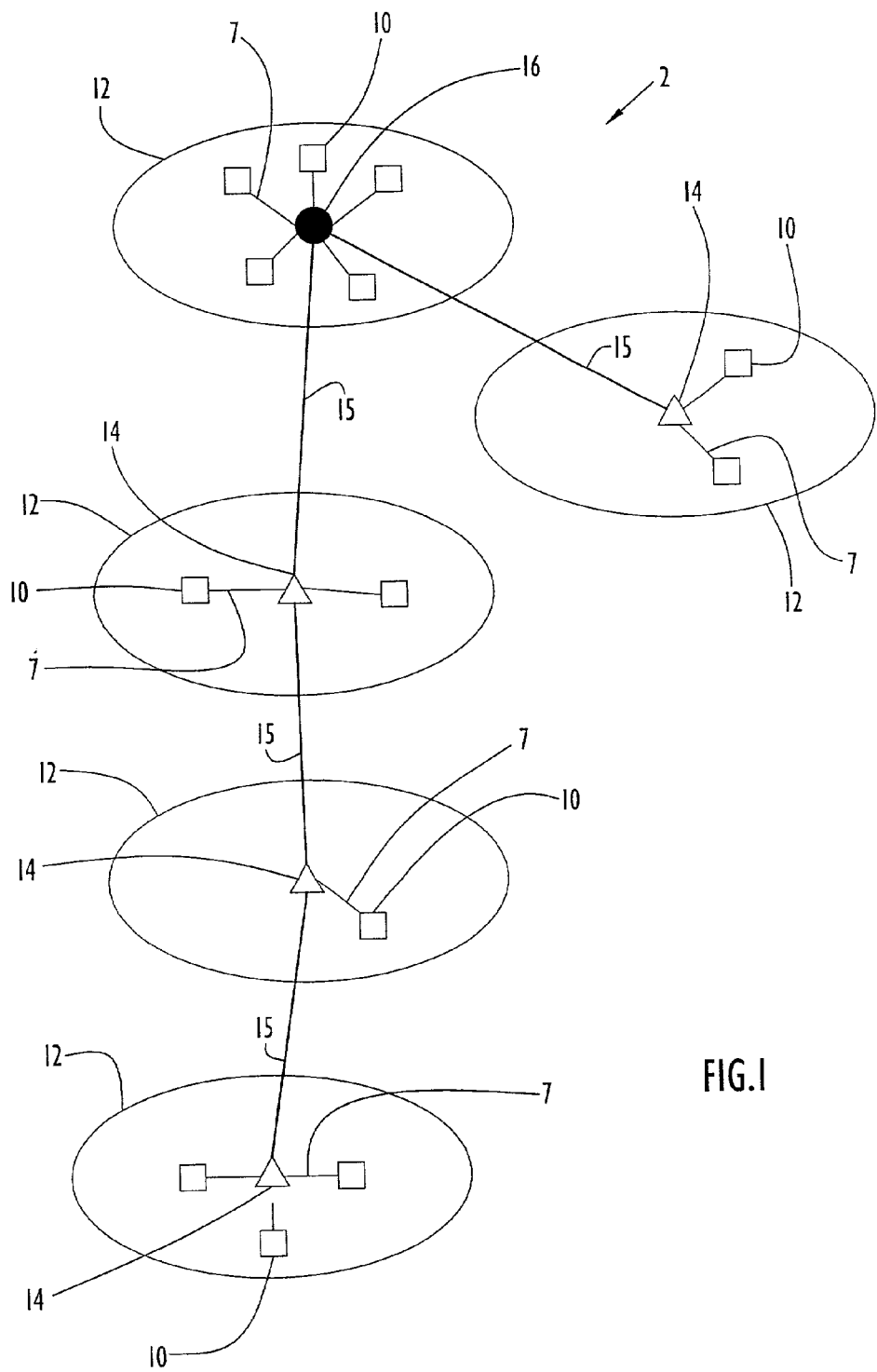
FIG. 1 presents a representative embodiment of controlled flood multicast (CFM) network nodes arranged in an exemplary CFM communication network.

Preferred embodiments according to the present invention are described below with reference to the above drawings, in which like reference numerals designate like components.

Overview

New on-demand routing techniques described here, and referred to collectively as Controlled Flood Multicast (CFM), distribute both unicast and multicast traffic in dynamically mobile, wireless, ad-hoc networks. A first set of techniques, efficiently collects and uses network topology information to build and dynamically maintain a mobile, wireless, ad-hoc network. A second set of techniques uses new on-demand routing methods to distribute both unicast and multicast traffic within the dynamically maintained network.

To route multicast traffic, a CFM communication node uses a controlled-flood technique to dynamically determine whether it should rebroadcast a flooded message based upon the present state of internally maintained network topology information. In this manner, the controlled flood technique dynamically adapts to changing mobility conditions. For unicast traffic, autonomous CFM nodes make intelligent routing decisions based upon a tiered hierarchy of locally maintained network topology information. If an individual node is unable to locate a path to a designated destination based upon its locally maintained information, the message can be routed within a minimum number of hops to a node that can. In this manner CFM network maintenance and routing overhead is distributed across the network.

System Architecture

An exemplary CFM wireless network is illustrated in FIG. 1. Specifically, wireless network 2 includes a plurality of nodes 10 arranged in cells or clusters 12 in accordance with cluster formation described in more detail below. Each cell or cluster includes corresponding cluster member nodes 10 with one of those cluster member nodes designated as a cluster-head node 14. These cluster arrangements form a first tier of network 2 and facilitate communication within a cluster between the cluster-head and member nodes over a communication link 7 preferably utilizing a first transmission frequency. The cluster-head nodes of each cluster are in communication with each other, preferably utilizing a second transmission frequency, and form a backbone network 15. The backbone network essentially forms a second tier of network 2 and facilitates communications between nodes of different clusters (e.g., generally providing communications over greater distances). The architecture of network 2 is similar to that of conventional cellular telephone systems, except that network 2 provides dynamic selection of cells and cluster-head nodes. The cluster-head nodes 14 within each network 2 select at least one gateway node 16 to establish a third logical routing tier that facilitates the dissemination of network routing information and maintains a comprehensive network routing table, such as in a tree form, that can be used to locate the next hop to a designated destination.

A CFM network can be considered an essentially flat network in which member nodes maintain their own subset of network topology data and link route information. CFM nodes share topology information with each of their respective neighbor nodes by periodically emitting beacon status messages containing (in addition to other information): a unique identification code of the member emitting the beacon; a list of multicast groups which the emitting member wishes to join; and, a unique identification code associated with each node from which the emitting member has received beacon status messages.

Each CFM node, when turned on, periodically transmits a beacon status message and builds and maintains a neighbor set that includes information received in beacon status messages from neighboring nodes. These neighbor sets provide the underlying network topology information upon which network routing structures and node level routing decisions are based.

Based upon a CFM node's neighbor set, a CFM node has access to, at any given time, the most accurate information available with respect to nodes within two hops of the node. Furthermore, messages distributed using CFM controlled flood techniques carry, within the message itself, the node identifier of each CFM node through which the message has passed. Each receiving CFM node stores this path information within its internal link cache and adds its own node identifier to the message path prior to retransmitting a received message. Given that the controlled flood process uses sophisticated, topology based decisions in routing each message, such link information is optimized, and until affected by subsequent dynamic changes in the CFM network topology, is quite reliable. Both node level information collection techniques (i.e., neighbor set collection and link cache information collection) impose minimal network overhead and processing. Link cache information is gathered with no additional traffic overhead, and neighbor beacon information is collected with minimal network overhead, since the beacon status message periodically transmitted by each CFM node is broadcast to nodes within the local vicinity of the transmitting node, only, and is not rebroadcast by the receiving nodes.

Due to the fact that each CFM node has access to such highly accurate and useful topology and route information, CFM techniques place significant autonomous decision making responsibility in the CFM node itself. In the two basic types of message transfer used by CFM: controlled flood and next hop, the CFM node itself makes the decision as to how message is to be routed. For example, with respect to the next-hop decision process used in unicast routing, a CFM node is free to determine the next hop in the route of a message whose destination that is within two hops of the CFM node. In controlled flood routing, used to support multicast distribution and to support unicast route discovery, the node itself determines whether it should rebroadcast the flooded message based upon its internally maintained neighbor set network topology information.

Although a significant amount of decision making responsibility is placed upon each of the respective CFM nodes, the network topology information contained within a node is relatively localized and might not be sufficient for effectively routing messages to destination nodes multiple hops away from the originating or receiving node. To resolve this issue, each CFM node processes internally stored network topology information to determine whether it is uniquely positioned, within the physical topology of the CFM network, to serve as a cluster-head node. Nodes that determine they should not serve as cluster-head nodes are referred to as member nodes. Collectively, CFM cluster-head nodes form a logical tier that facilitates the creation of a routing tree centered on the gateway.

A CFM node that determines that it must serve as cluster-head indicates in its beacon status messages that it is serving as a cluster-head node. Member nodes use an internally stored decision processes to choose, from the set of cluster-head nodes within broadcast range, a single cluster-head with which to affiliate. A cluster-head node maintains a cluster member set containing identities of the member nodes that have affiliated with the cluster-head. Once affiliated with a cluster-head, a member node performing next hop routing will forward to the cluster-head those messages for which it cannot determine an efficient path based upon information contained within its internally maintained neighbor set and link cache. Cluster-head nodes are able to route the message through the gateway or choose an optimum next hop, based upon internally stored routing information.

To assure that cluster-head routing tables are complete, each cluster-head employs a common criteria to select a gateway node based upon its current base of network topology information. The role of a gateway node is to maintain a comprehensive gateway routing table. A cluster-head will send its cluster-member set to the gateway node via a process known as joining the gateway. Each cluster-head node, through which a join request message passes along the path to its chosen gateway node, will copy the cluster-member set information contained within it and use the copied information to build and maintain a locally stored cluster-head routing table. Likewise, the gateway will use the cluster-member set information contained within the join requests received from each of the respective cluster-heads to build and maintain a gateway level routing table containing routing information for every node within the CFM network. The gateway level routing table can be stored in a tree structure and is referred to as a gateway based tree (GBT).

As previously discussed with respect to the deficiencies of Core Based Tree (CBT) techniques, CBT maintains only a single tree, but, is inefficient in delivering messages, for all messages are routed through a single CBT rendezvous point. CFM avoids CBT inefficiencies by using CFM/GBT techniques to route unicast traffic.

First, a CFM network reduces the overhead associated with joining the gateway. The gateway is similar in function to a CBT core or RP. All the nodes are organized into clusters and there is a cluster head inside each cluster. Even though this hierarchical approach has been mentioned in the literature on CBT, the CFM techniques and structures described here form a better way of dynamically generating the cluster heads and only cluster heads can send join traffic to the gateway. Local connectivity information that is obtained through periodic transmission of beacons is used to select the cluster head deterministically.

Second, CFM routes do not have to follow the tree branches and depend upon the gateway for delivery. If better routes exist in terms of link metrics, the better route is selected. This better route could come from neighbors within two hops, a cached route or others (described later). For multicast, controlled flood is the principal technique. Using this technique, only certain nodes have to forward the flood packet. Each node dynamically determines at the time of packet reception whether to flood the packet again. Every node can receive the multicast packet. But, only a small number of nodes have to transmit. Therefore, this approach is independent of the number of multicast groups. It can adapt to mobility, because the transmitting nodes are dynamically determined at the time of packet transmission or reception.

Third, CFM does not repair routes by explicitly fixing individual broken links. Instead, portions of the GBT are updated as fresh connection information becomes periodically available to the gateway CFM node. Furthermore, the entire GBT can be periodically refreshed and/or re-established on another CFM node more optimally positioned to serve as a CFM gateway node. Through use of CFM cluster-head techniques the GBT can be efficiently and effectively refreshed with minimal impact upon the network. Neither CBT or CFM can guarantee delivery of a message in the event of a broken link, however, CFM has the added advantage that a message, if undeliverable because of a broken link, can be effectively routed using controlled flood techniques until the link can be re-established down stream.

Fourth, individual CFM controlled flood messages can record en-route path information that includes the identity of intermediate nodes traversed by the flooded message. This information can be stored be en-route nodes, as well as the destination node, to build additional link caches that can be used to route unicast messages.

In a CFM network, preferably all nodes are capable of serving as a member, cluster-head, or gateway node. The role that each node plays in the network is based upon dynamically changing network topology information. Hence, in a highly mobile environment, the role that each node plays is also dynamic. The nodes themselves autonomously determine the role that each must play based upon an internal analysis of network topology information received from their fellow nodes. For example, a node situated amongst many similarly situated nodes may determine based upon an analysis of its internally stored network topology information that it should serve as a member node. If so, the node will contribute to network efficiency by making autonomous, intelligent routing decisions based upon the present state of its neighbor set and accumulated link cache. Alternatively, a node may determine, based upon an analysis of slightly different neighbor set topology information, that it should serve as a cluster-head node. If so, the node will autonomously select and join a gateway node and initiate the creation and continued maintenance of a cluster-head routing table that will be used to route future messages. As the topology of the dynamic, ad-hoc, mobile CFM network continues to evolve, so will the behavior of the respective nodes.

It should be noted that the operations performed by member, cluster-head, and gateway nodes are not, necessarily, mutually exclusive. For example, member, cluster-head and gateway nodes maintain neighbor sets and may route received messages to destinations within two hops based upon their respective neighbor sets. Further, member, cluster-head, and gateway link caches may be identical in structure, and may be used by the respective nodes in a similar manner. Still further, cluster-head and gateway node routing tables may be identical in structure, and may be used by the respective nodes in a similar manner. Such consistency in structures, operations, and data allow CFM nodes to more quickly transition from one role to another.

The CFM techniques described here efficiently build and distribute network topology and routing information and efficiently route both unicast and multicast traffic throughout a dynamically mobile, wireless, ad-hoc network. Preferably each CFM node is capable of serving as either a member, cluster-head or gateway node. Dynamic selection of cluster-head and gateway nodes allows the network to logically adjust to dynamic changes in its physical topology. Cluster-head nodes build cluster routing tables based upon neighbor set information received from neighboring nodes as well as cluster-member sets generated from information received via join requests passing through the node on their way to the gateway node. Gateway nodes generate comprehensive network routing tables, facilitate the collection of network routing information among cluster-head nodes via the gateway join process, and serve as a third routing tier should a cluster-head fail to locate a route to a designated destination.

CFM nodes share beacon updates and maintain an internal store of local topology information, known as neighbor sets, upon which network hierarchy and message routing decisions are later based. For example, a CFM node uses its local neighbor set to determine whether it must rebroadcast controlled flood messages. In addition, CFM nodes build and maintain local link caches based upon information extracted from relay paths contained within messages received. Furthermore, cluster-head and gateway nodes build routing tables based upon gateway path information and member node/cluster-head affiliation information obtained via JOIN-REQUEST and JOIN-ACK message when the respective cluster-heads attempt to join a selected gateway node.

A CFM node can route unicast messages towards any destination node that is within two hops based upon information contained within its neighbor set. If a member node is unable to locate a destination node within two hops, the member node will attempt to locate a path to the destination within its stored link cache, and if unsuccessful, route the message to its upstream cluster-head node. If a cluster-head is unable to locate a destination node within two hops using its neighbor set, it will first attempt to locate a path to the destination within its internal routing table, and then attempt to locate a path to the destination within its local link cache. If the cluster-head is unable to locate a path to the destination via these techniques, it will route the message to its upstream cluster-head (i.e., the neighboring cluster-head node one hop closer to its selected gateway node). A gateway node uses the same techniques employed by a cluster-head node, however, its routing table is more comprehensive than that of a cluster-head, and is more likely to locate a path to the destination. If a gateway node is unable to locate a path to the destination node by any of these means, it will broadcast the message via controlled flood. Controlled flood techniques streamline multicast traffic distribution and facilitate route discovery for unicast message deliveries for which no route can be determined.

CFM Node

FIG. 2A presents an exemplary representation of the CFM system architecture. The application layer 3 receives traffic from a traffic generation unit 1 and passes it through a UDP layer 4 and an IP layer 5 to reach the intranet layer in which this invention may be centered. The intranet layer includes three modules that are centers of this invention. The CFM message forwarding module 6, forwards either multicast or unicast traffic. If the input is multicast, the message is forwarded using controlled flood. If the input is unicast, the packet is forwarded using either controlled flood or unicast depending upon whether the next hop can be determined. The CFM dynamic network maintenance module 8 performs neighbor discovery, selects a gateway and creates a routing tree centered at the gateway. The multiplexer module 9 directs message traffic. If the traffic comes from CFM dynamic network maintenance module 8 or the CFM message forwarding module 6, it is sent to the link layer 11. If the traffic comes from link layer 11, it is either sent to the CFM dynamic network maintenance module 8 or the CFM message forwarding module 6 depending upon the message type. Finally, traffic from the intranet is sent to the link layer 11 and transmitted from the radio 13. On the other hand, the traffic received from radio 13 is forwarded following the reverse path described before.

Figure 2B:
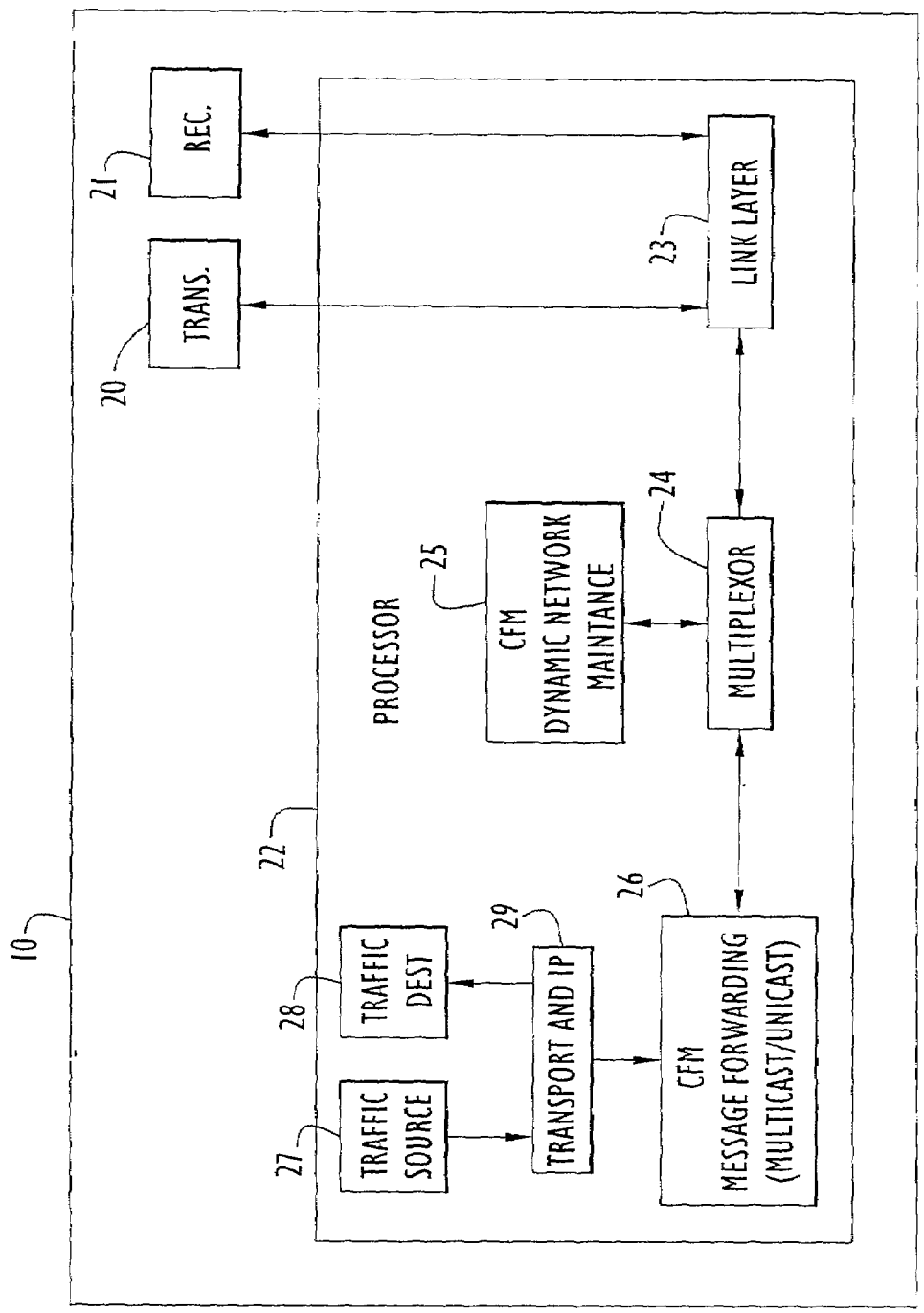
FIG. 2B presents a representative system level embodiment of a typical CFM communication node.

A CFM node 10 that includes the CFM system architecture presented if FIG. 2*a* is illustrated in greater detail in FIG. 2B. Specifically, node 10 includes a transmitter 20, a receiver 21 and a processor 22. The processor 22 preferably is a conventional microprocessor or controller and controls the node to transmit and receive messages in accordance with CFM communication protocols. The transmitter 20 preferably is a conventional transmitter and transmits messages from the processor, preferably in the form of radio frequency (RF) signals, in accordance with processor instructions. Receiver 21 preferably is a conventional receiver and configured to receive signals, preferably in the form of radio frequency (RF) signals, transmitted by the transmitter of another node. The receiver receives transmitted signals and forwards the received signals to processor 22 for processing. The node further includes an identifier (e.g, a code or identification number) to identify the particular node and it includes a database (not shown) to store information pertaining to neighboring nodes to facilitate cluster formation as described below. A cluster-head node 14 and gateway node 16 is substantially similar to node 10, described above.

Further shown in FIG. 2B, are exemplary processing units supported by the CFM communication node processor 22 that may include: a message link layer module 23; a message multiplexor module 24; a CFM dynamic network maintenance module 25; a CFM message forwarding module 26; an IP and transport layer 29; as well as a traffic source unit 27 and a traffic destination unit 28. As described above in relation to FIG. 2A, the CFM dynamic network maintenance module 25 supports the dynamic construction, and maintenance of the CFM network topology and distribution of CFM network topology information. The CFM dynamic network maintenance module includes support for, in addition to other capabilities: neighbor discovery through the transmission and receipt of beacon status messages; maintenance of the local node repository information including the node's neighbor set, link cache, and routing table; member/cluster-head node status determination; gateway selection; and the gateway join process. The CFM multicast/unicast message forwarder 26, coordinates transmission and receipt of unicast and multicast level messages to/from the CFM communication node in accordance with CFM unicast and multicast forwarding strategies and techniques described herein. Furthermore, the CFM multicast/unicast message forwarder 26 serves as an interface between the message multiplexor 24 and traffic source 27 and traffic destination unit(s) 28 supported by the communication node. The module multiplexer 24 directs message traffic. If the traffic comes from the CFM dynamic network maintenance module 25 or message forwarder 26, it is sent to the link layer 23 and transmitted from the radio via transmitter 20. If the traffic comes from link layer 23, it is either sent to the CFM network maintenance module 25 or to the message forwarder 26, depending upon the message type.

Referring again to FIG. 1, the arrangement of nodes 10 within clusters 12 and the designation of cluster-head nodes 14 and gateway nodes 16 are dynamically determined. Cluster formation and adjustment of the interval between beacon status message transmissions are performed within wireless ad hoc type networks using CFM techniques. Cluster formation facilitates arrangement of the network nodes 10 into clusters 12 and designation of cluster-head nodes 14 to form backbone network 16. Processing is distributed in a manner that enables each CFM node to determine its status as a cluster-head or member node in accordance with local connectivity information received within beacon status message transmissions from neighboring nodes. The interval between beacon status message transmissions is dynamically adjusted. The initial value for that interval is not critical to cluster formation. Generally, the initial interval between beacon status message transmissions is set to a low value to form clusters rapidly. If the initial interval is set to a value below an acceptable range, the network becomes congested due to transmission of excessive quantities of beacon status messages. If the initial interval is set to a value above an acceptable range the network will be slow in establishing itself to the point where it can effectively route messages. Furthermore, if the interval between beacon status message transmissions is set, or remains, above an acceptable range once the network is established, the network will experience an increase in both unicast and multicast routing failures due to outdated routing and topology information retained in the respective CFM nodes and CFM nodes will be slow in dynamically optimizing the network hierarchy to meet a changing network physical topology. Pending U.S. application Ser. No. 09/709, 502, filed Nov. 11, 2000, entitled, Method and Apparatus for Communication Network Cluster Formation and Transmission of Node Link Status Messages with Reduced Protocol Overhead Traffic," discloses representative embodiments of techniques for optimizing the interval between beacon status message transmissions and is hereby incorporated by reference in its entirety. CFM uses such techniques to automatically optimize the interval between beacon status message transmissions and to achieve dynamic network performance and responsiveness without generating overly burdensome network traffic.

A beacon status message, transmitted by a CFM node upon expiration of a beacon status message interval, allows the CFM node to periodically share, with CFM nodes within its broadcast range, internal status changes and topology information that it has received via beacon status messages from other CFM nodes. Because of dynamic changes in the network, detected in the CFM network's topology based upon the exchange of these beacons status messages, a CFM node's gateway and cluster-head selections should be periodically re-evaluated. Therefore, in addition to the beacon status update message interval, each CFM node can have a refresh interrupt interval. The refresh interrupt can be dynamically optimized to assure a refresh rate that is reflective of the rate of change in the CFM network's topology. For example, to establish a refresh rate that is dynamically optimized with respect to the mobility of CFM nodes in a network, for example, a CFM node can measure, for instance, overhead traffic rates and/or the number of broken links of which it has knowledge. The CFM node can then dynamically vary the CFM node's refresh interrupt interval to hold both parameters within pre-established limits. In this manner, CFM nodes within a portion of the CFM network that is undergoing a period of rapid change might have a higher refresh rate than a portion of the CFM network in which the nodes are physically stationary or are not changing location as rapidly.

Upon expiration of a refresh interrupt interval a CFM member node will assess its neighbor set (as described in relation to FIG. 5, below) to determine whether it should designate itself as a cluster-head or remain a member node. If the CFM node remains a member node, it will assess its selected cluster-head affiliation, as described in relation to FIG. 7, below. If the CFM node designates itself a cluster-head, it will proceed with the gateway selection process and join-gateway process, as described below in relation to FIG. 6 and FIGS. 8–10.

Likewise, upon expiration of a refresh interrupt interval a CFM gateway node will assess its neighbor set (as described in relation to FIG. 5, below) to determine whether it should designated itself as a member node or remain a cluster-head node. If the CFM node designates itself as a member node, it will assess its selected cluster-head affiliation, as described in relation to FIG. 7, below. If the CFM node designates itself a cluster-head, it will proceed with the gateway selection process and join-gateway process, as described below in relation to FIG. 6 and FIGS. 8–10. If the CFM node remains a gateway, or becomes a cluster-head, it rebuilds its internal routing table from its internal neighbor set information.

The ability for CFM nodes to reset themselves, as described above, is made possible by the fact that their respective neighbor sets are not inconsistent, due to the use of periodic beacon status updates, as described above. Individual nodes, therefore, using the same internal processes to assess consistent neighbor set information will select consistent network hierarchy roles. However, individual CFM nodes are independently asynchronous. Therefore individual reset timeouts may occur within different CFM nodes at different times resulting in discrepancies in the respective nodes' network hierarchy expectations. Fortunately, as described above, the roles performed by the respective CFM nodes are not mutually exclusive, and each will continue to route messages based upon its present role with the neighbor set, routing table, and link cache resources available to it. Furthermore, in order not to disrupt the on going traffic, CFM nodes maintain original configuration data until required new configuration data created.

Beacon Transmission

Figure 3:
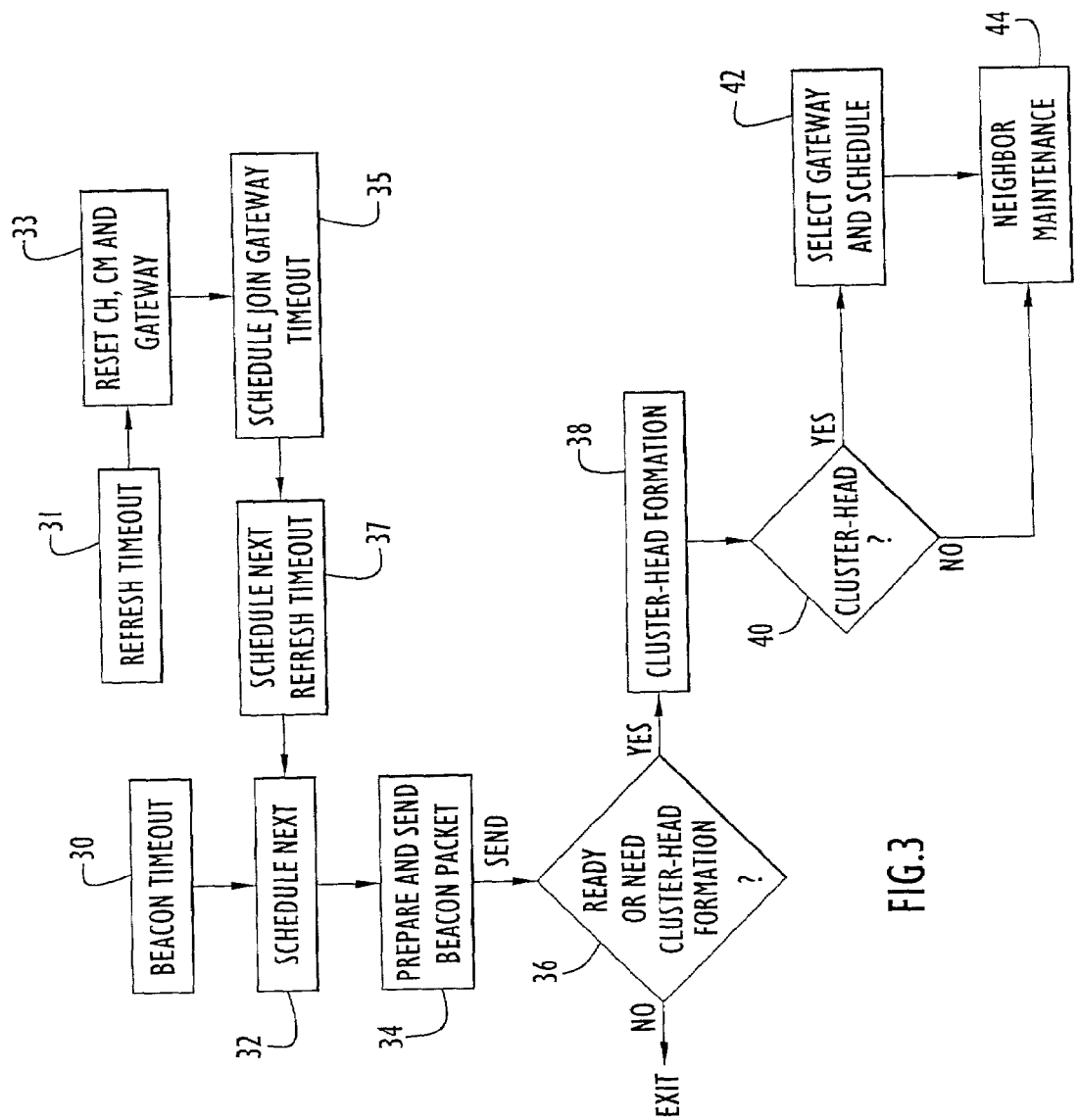
FIG. 3 presents a procedural flow chart illustrating an embodiment of a representative CFM technique for beacon transmission.

FIG. 3 presents a process flowchart of the activities that are initiated upon expiration of a beacon status message or refresh interrupt interval. If the appropriate beacon interval is unknown, the initial beacon interval is set to a small value when the node is first powered on and the interval is later adaptively adjusted. Upon a beacon status message interval timeout 30 a new beacon status message timeout is scheduled 32 based upon a dynamically determined interval determined in accordance with the exemplary and non-limiting examples presented in pending U.S. application Ser. No. 09/709,502, as described above. A beacon status message is then prepared and transmitted 34, that includes the CFM nodes most recent node status and neighbor set information.

Likewise, upon a refresh interrupt timeout 31, the CFM node will reassess its role within the CFM network hierarchy 33, as described above. The node will then set a join-gateway timer 35, set a new refresh timeout 37, and schedule a new beacon status message timeout 32, as described above. A beacon status message is then prepared and transmitted 34, as described above, that includes the CFM node's most recent node status (as determined in operation 33) and neighbor set information.

In the case of both a beacon or refresh timeout, upon transmitting a beacon status message 34, the CFM node will assess, based upon its node and neighbor set status, whether to proceed with cluster-head formation 36, as described above. For example, if N continuous beacon intervals are passed and there are no new neighbors discovered 36, cluster formation processing starts 38. If the node decides to proceed with cluster-head formation 38, it can do so as presented in relation to FIG. 5, below, otherwise the process exits. If the node determines that it must serve as a cluster head 40, it will proceed with the gateway selection process and join-gateway process 42, as described below in relation to FIG. 6 and FIGS. 8–10. To prevent beacon packets and join-gateway packets from being sent at the same time, the join-gateway packet can be sent midway between two consecutive beacon packets. Regardless, the CFM node will continue to receive beacon status messages and to perform neighbor maintenance 44, as described above.

Beacon Reception

Figure 4:
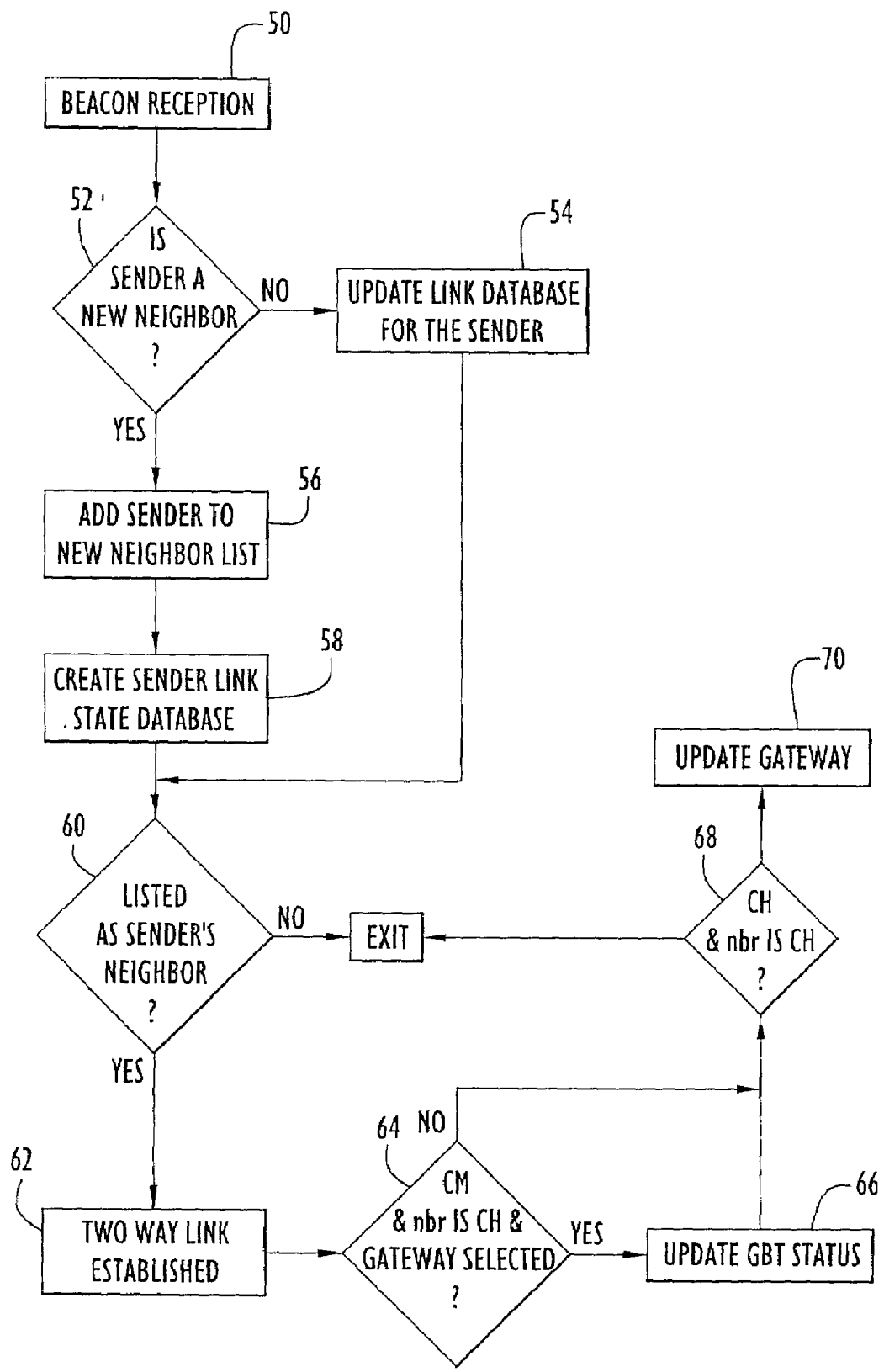
FIG. 4 presents a procedural flow chart illustrating an embodiment of a representative CFM technique for beacon reception.

FIG. 4 provides an overview of CFM node beacon reception and neighbor maintenance. Upon reception of a beacon status message 50, the receiving CFM node will search its neighbor set to determine whether the sender is a new neighbor (i.e., whether this is the first beacon status messages received from the transmitting node) 52. If the neighbor is new, its identity and neighbors are added to the receiving CFM nodes neighbor set 56, and an entry is added to the receiving CFM node's link state database 58 used to store information on active links to neighbors. The link state database includes, for example, a list of neighboring nodes and, for each node listed, identifies the node's station classification (e.g., gateway, cluster-head, or member); number of hops to the gateway; assigned multicast groups; and whether a two-way connection exists. If the neighbor is not new, the receiving CFM node uses the information within the beacon status message to update its neighbor set, routing tables and link status database 54. Regardless of whether the neighbor is new, or known, the receiving node determines if the neighbor set information received from the transmitting node indicates that the transmitting node has received a beacon status message from the receiving node 60. If not, the process exits. If so, the link state database is updated to reflect the existence of a two-way connection between the nodes 62. If the receiving CFM node is a cluster member and the sender is a cluster-head and the gateway is selected 64, the selected gateway and its connectivity are recorded to update the gateway based tree status 66. If the gateway is the receiving CFM node's one-hop neighbor, the CFM node is affiliated directly with the gateway. If the node determines that it must serve as a cluster-head 68, and the sender is also a cluster-head, the gateway selection is updated 70. If the receiving node does not serve as a cluster-head 68, the process exits.

Neighbor Maintenance

Ad-hoc, wireless, mobile networks have the potential to be extremely dynamic. Mobile nodes, for example could simply move out of range or disappear due to equipment failure or a variety of other reasons. Therefore, in order to maintain the integrity of the network's routing infrastructure, node neighbor tables periodically must be searched and stripped of potentially invalid information. Upon the receipt of each beacon status message, a CFM node will review its neighbor set table to determine if it includes neighbors from which a beacon status message has not been received for a dynamically configurable number (K) of continuous beacons. This would occur, for example, if a CFM node from which another CFM node had previously received a beacon status message, and therefore added to its neighbor set, had moved out of broadcast range for an extended period of time. Since such nodes are no longer neighbors, once identified, they are removed from the CFM node's neighbor set.

Cluster-Head Node Determination

Figure 5:
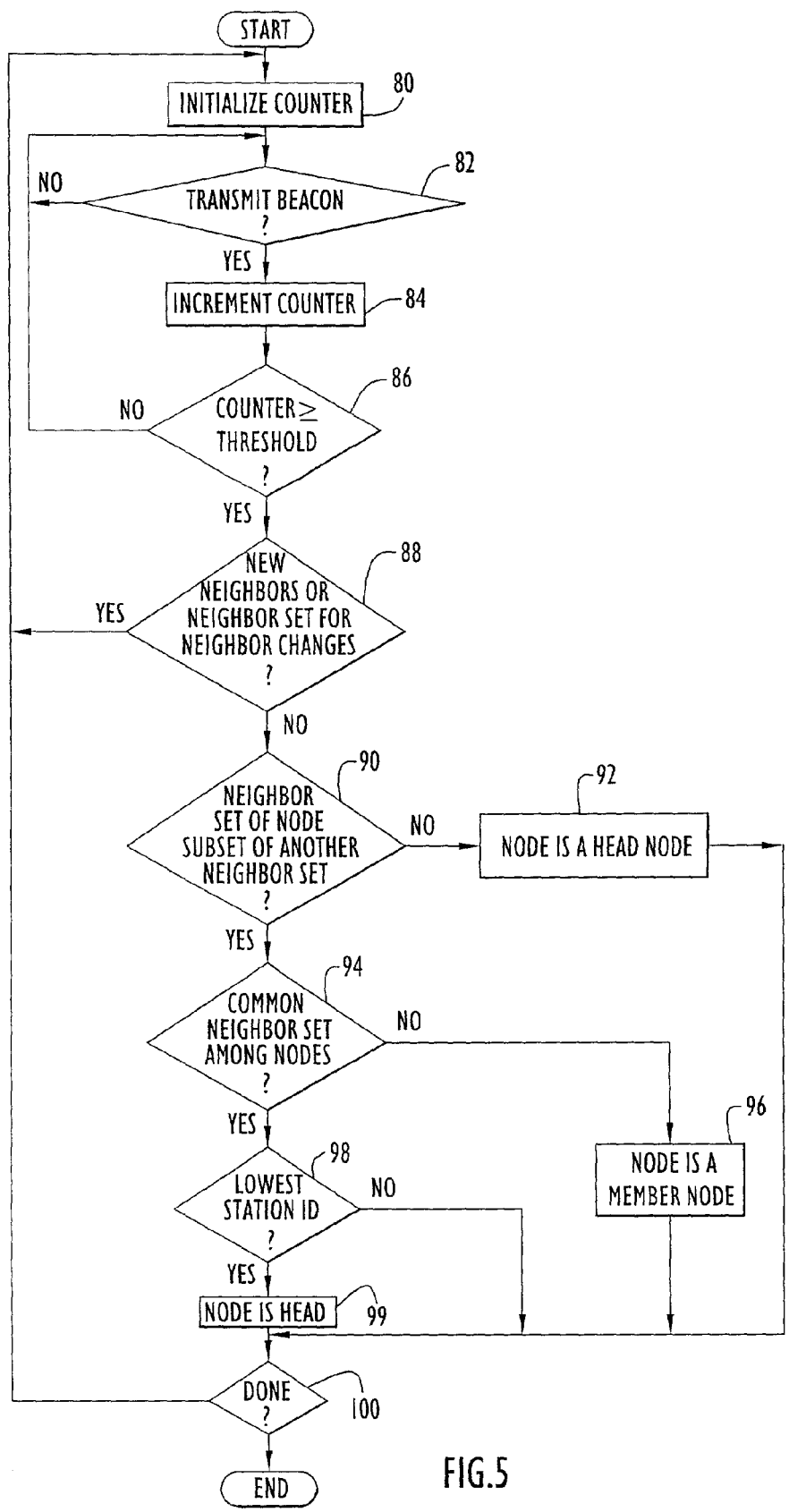
FIG. 5 presents a procedural flow chart illustrating an embodiment of a representative CFM technique by which a CFM communication node can autonomously determine its status as a cluster-head or member node.

The manner in which a processor of a CFM node determines head or member status of that node to facilitate cluster formation is illustrated in FIG. 5. Initially, cluster formation is distributed among CFM nodes where each node determines its status as a cluster-head or member node. Node status is determined by each node upon transmission of a predetermined quantity of beacon status messages by that node and in response to no new neighbors being discovered and no changes within neighbor sets occurring during the beacon status message transmissions. Specifically, a beacon status message counter is initialized by the CFM node processor at operation 80. The CFM node transmits beacon status message including corresponding neighbor information upon subsequent beacon status message timeouts and adjusts the interval between those transmissions, as described above in relation to FIG. 3. In response to transmission of a beacon status message as determined at operation 82, the counter is incremented at operation 84. If the counter is not greater than or equal to a predetermined threshold as determined at operation 86, thereby indicating that the predetermined quantity of beacon status messages has not been transmitted, the CFM node continues to monitor transmission of beacon status messages and increment the counter as described above.

When the message counter accumulates a value greater than or equal to the predetermined threshold, thereby indicating transmission of a sufficient quantity of beacon status messages, also referred to as a session of beacon status messages, the node processor determines at operation 88 whether or not new neighbors have been discovered or a neighbor set has changed. If either of these conditions has occurred during transmission of the beacon status messages, the counter is re-initialized at operation 80 and the processor waits for the occurrence of appropriate conditions (e.g., no new neighbors and no changes within neighbor sets) within succeeding sessions of beacon status message transmissions (e.g., intervals where the predetermined quantity of beacon status messages are transmitted) as described above. The predetermined quantity of beacon status message transmissions may be set to any desired value.

Once a session of beacon status message transmissions occurs without discovering a new neighbor and without changes in neighbor sets, the node processor determines at operation 90 whether or not a neighbor set associated with the CFM node is a subset of a neighbor set of any neighboring nodes. The neighbor sets for this determination are stored within the CFM node database as described above. In other words, the processor determines for the neighbor set, S, associated with the CFM node the presence of a neighbor set, $S_m$, associated with another node 'm' that satisfies the condition of $S \subset S_m$ (e.g., S is a subset of $S_m$), where m is generally an integer from one to the quantity of neighboring nodes. If the neighbor set S associated with the CFM node is not a subset of any neighbor sets of neighboring nodes, this indicates that there exist some nodes within the associated neighbor set S that can establish communications only through the CFM node. Thus, the CFM node is determined to be crucial to relaying traffic and is designated as a cluster-head node at operation 92.

If the neighbor set S associated with the CFM node is a subset of a neighbor set of a neighboring node, the node processor determines at operation 94 if there exists a common neighbor set associated with the CFM node and each of the neighboring nodes (e.g., each neighbor set associated with the CFM node or neighboring nodes is equivalent to each other). In other words, the processor determines the presence of a neighbor set, C, equivalent to each neighbor set, $S_i$, in the CFM node database, where 'i' is generally an integer from one to a quantity of nodes including the CFM node and its neighboring nodes. This occurs in the event of a network architecture of fully connected nodes where each node has the same neighbors, thereby producing equivalent neighbor sets. When there is no common neighbor set, this indicates that the neighbor sets associated with the CFM node is a subset of another neighbor set as described above. Thus, the neighbors of the CFM node may facilitate communications through a node associated with that other neighbor set. Accordingly, in this situation the CFM node is not crucial to relaying traffic and at operation 96 is designated as a member node. If, in operation 94, it is determined that the neighbor sets are equivalent, the next determination is whether the CFM node has the lowest unique node identifier 98. If so, it is selected as the cluster-head node 99. If not, it is determined whether the process is complete 100. If so, the process ends, otherwise, the process returns to the beginning. Upon determining the status of the CFM node as either unchanged, a cluster-head, or a member node, at operations 88, 92, 96, or 99, as described above, it is determined whether the process is complete 100.

The member/cluster-head decision process is not performed merely upon node startup. Upon reception of any beacon status message, a CFM node may review changes made to its internally stored neighbor set as a result of information contained within the beacon status message. If the CFM node determines, based upon changes in the network topology, that its role must change, it will update its node status, as illustrated in FIG. 5, to reflect the appropriate role.

Gateway Node Selection

If a CFM network's routing structure were to consist merely of cluster-head nodes, selected as described above, a CFM node at the time that it determines that it must serve as a cluster-head node, would have a relatively limited view of the surrounding network. The cluster-head's neighbor set, for example, would only contain information about CFM nodes within two physical hops of the cluster-head. Even if the cluster-head were to build a router table based upon this information, it would be very limited with respect the routing services that it could supply.

Fortunately, CFM expands the routing capabilities of cluster-head nodes by introducing a third network tier referred to as a gateway node, and a new process referred to as joining the gateway node. Furthermore, the process of joining the gateway enables the gateway node to build a comprehensive routing table that encompasses all nodes within the network.

From the perspective of a single cluster-head node, the gateway selection process begins once the CFM node determines that it must serve as a cluster-head node. Fortunately, in making an initial gateway selection, the cluster-head need only look so far as it's own neighbor set. Beacon status messages received from neighboring CFM nodes include the identity of the transmitting node, it's multicast groups, as well as the identity of each transmitting node's neighbors and each neighbor's multicast groups. Furthermore, each beacon status message includes a node status field that indicates whether the transmitting CFM node is a member node or a cluster-head node. If the transmitting node is a cluster-head, the received beacon status message will contain: the identity of its selected gateway and the selected gateway's connectivity or number of neighbors; status information such as whether a path to gateway exists, and the cost in hops from the cluster-head node to the gateway node. This information is stored in the neighbor set of each CFM node receiving the beacon. Therefore, at the time a CFM node identifies itself to be a cluster-head, it holds significant knowledge of its immediate surrounding cluster-head nodes, which may include significant information about gateway selection. In choosing its initial gateway node, the cluster-head node searches its internal neighbor set and selects as its gateway node the cluster-head, or gateway node with the largest number of cluster-head connections. In the case of a tie regarding connectivity, the cluster-head with the smallest ID number is selected as a gateway.

Figure 6:
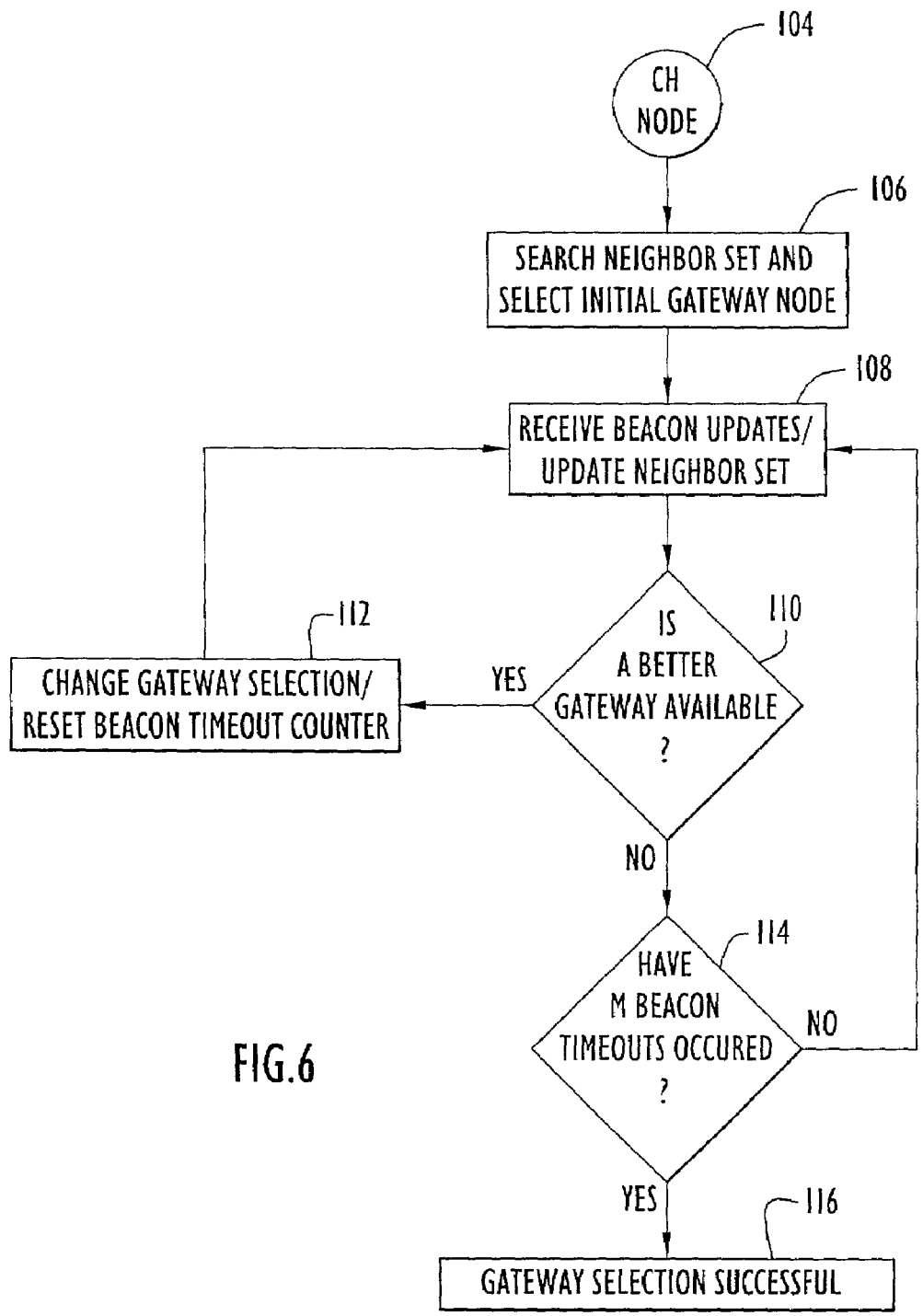
FIG. 6 presents a flowchart illustrating an embodiment of a representative CFM technique by which CFM cluster-head nodes select a CFM gateway node.

Initial selection of a gateway node by a single cluster-head, however, does not complete the CFM gateway selection process. FIG. 6 presents an overview of the extended CFM gateway selection process initiated by a CFM node once it determines, in accordance with the process described in association with FIG. 5, that it must serve as a cluster-head node 104. At this time, as indicated at operation 106 of FIG. 6, the cluster-head searches its neighbor set and selects as its gateway the cluster-head node with the greatest number of cluster-head connections. Alternatively, cluster-head selection can be based upon a combination of criteria. The objective of the selection process is the selection of a gateway node that is sufficiently connected within the overall CFM network to serve a good physical location for the CFM gateway routing table. Numerous specific criteria or combinations of criteria could be used to implement this objective. For example, a selection criteria that assesses the strength of the signals associated with the respective cluster-head connections, as well as the overall number of cluster-head connections, can be used in certain instances to identify the best gateway node candidate.

Next, the cluster-head waits for an incoming beacon status message and proceeds to update its neighbor set accordingly 108. If information is received that indicates a better gateway node than that previously selected 110, the cluster-head selects the new cluster-head as its gateway and resets the beacon timeout counter 112. Upon the occurrence of a dynamically configurable maximum number of beacon timeouts (M) without changing the selected gateway 114, the gateway selection process is considered a success 116. If M beacon timeouts have not occurred, the process returns to operation 108. In a dynamic CFM network, especially in response to the introduction of multiple new CFM nodes, or upon the movement of a large number of CFM nodes, multiple cluster-heads may engage in the gateway selection process simultaneously. Depending upon the maturity of the CFM network, and the proximity of the gateway selecting cluster-head to a cluster-head with a stable gateway selection, information contained within beacon status message received by the gateway selecting cluster-head may, initially, be very sparse. With the continued exchange of beacon status messages, and with the initiation of gateway join processes, however, information contained within subsequent beacon status message will continue to improve.

The gateway selection process is not only performed upon startup of a cluster-head to node. Upon reception of any beacon status message, a cluster-head will review changes made to its internally stored neighbor set as a result of information contained within the beacon status message. If a cluster-head or gateway node is identified with a greater number of cluster-head connections than the presently selected gateway, the cluster-head node may reinitiate the gateway selection process.

It is possible, based upon a review of its internally stored neighbor set information, that a cluster-head may select itself as its gateway. In such a case, the node would not initiate the join request sequence, however, it would proceed to update its status information, neighbor set, and router table, accordingly. Furthermore, future beacon status messages initiated by the node would reflect its current gateway selection and gateway status information. If, upon receipt of beacon status messages from other CFM nodes, the node identifies a better gateway connection than itself, it will update its gateway selection, as described above, and initiate the gateway join process.

There may be times in the evolution of a CFM network during which portions of the CFM network have selected and joined separate gateway nodes. With each CFM node beacon status message timeout, however, each CFM node will propagate its gateway selection across the network. As the respective nodes establish a common base of gateway selection information, the network is likely to converge upon to a common gateway node.

Cluster-Head Affiliation

Similar to the gateway selection process performed by cluster-head nodes, is a process performed by CFM member nodes referred to as cluster-head affiliation. As previously described, once a member node affiliates with a cluster-head node, the member will rely upon the selected cluster-head to assist in routing messages for which the member node is unable to locate an efficient path based upon the member nodes neighbor set and local link cache. The CFM member node affiliation process is presented in FIG. 7.

Figure 7:
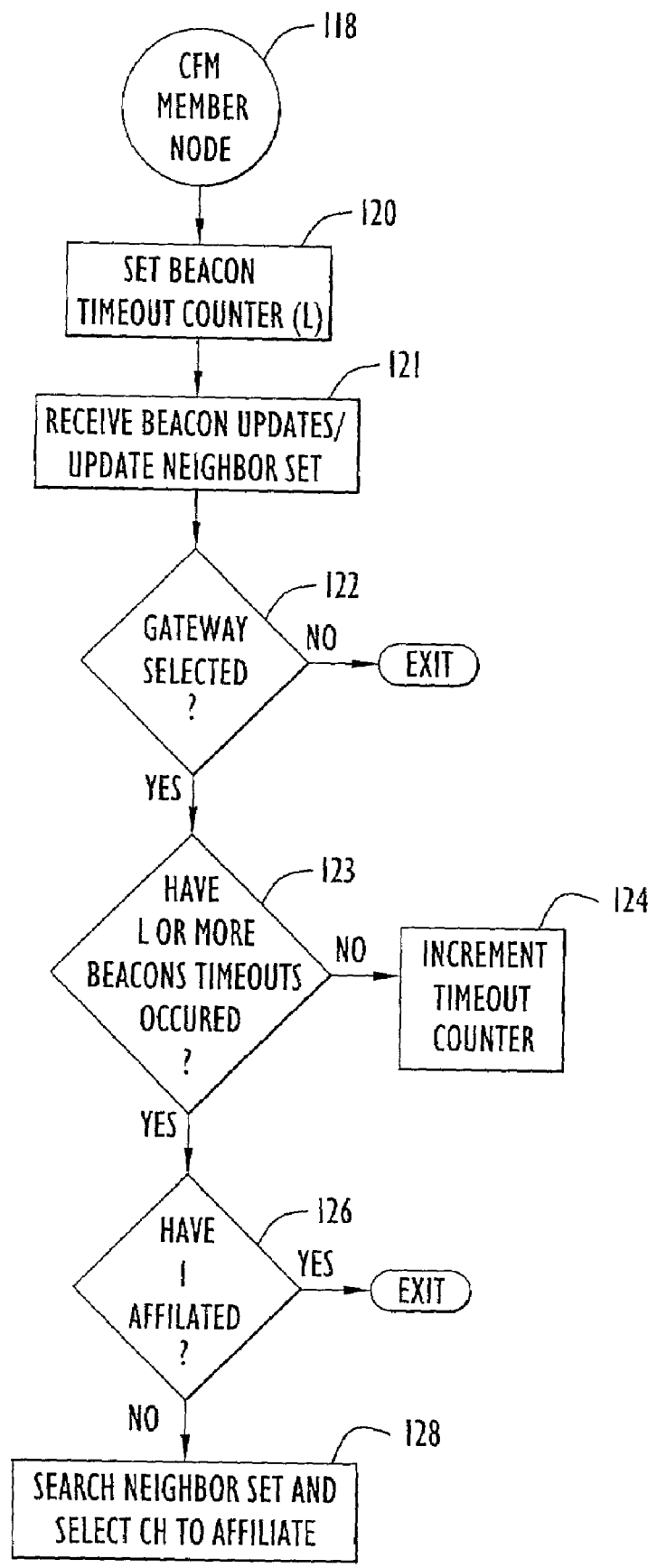
FIG. 7 presents a flowchart illustrating an embodiment of a representative CFM technique by which a CFM member node selects an affiliated CFM cluster-head node.

The process shown in FIG. 7 begins when there is a join-gateway timeout and the CFM node is a cluster member 118. The cluster-member node sets a beacon timeout counter (L) as shown in operation 120. The value of beacon timeout counter (L) may be dynamically determined, however, the beacon timeout counter must allow a sufficient number of beacon intervals to elapse for the member node's surrounding cluster-head nodes to successfully perform their respective gateway selection and gateway join processes and report their respective gateway status information via beacon status messages received by the member node. In this manner the member node's neighbor set will contain sufficient information by which to make an intelligent cluster-head selection. As indicated by blocks 122 through 128, the cluster-member receives beacon timeouts and updates its neighbor set and timeout counter 121. If a gateway has been selected 122, and L or more beacon timeouts have occurred 123, and the CFM member node has not yet affiliated with a cluster-head node 126, the CFM member node will search its neighbor set and select a cluster-head with which to affiliate 128. Otherwise, if L or more beacon timeouts have not occurred, the node updates its beacon timeout counter 124 and postpones the affiliation process until all of the above conditions are met. If a gateway has not been selected 122 or the node has not yet affiliated with a cluster-head node 126, the process exits.

A CFM member node's selection of a cluster-head with which to affiliate could depend on several factors and various approaches can be used. One approach is to select a cluster head randomly from all the neighboring cluster heads. Such an approach would provide a uniform distribution of cluster members affiliated to cluster heads. Another approach is to base the decision upon the received signal strength. Another possible approach, if one or more neighboring cluster-heads has performed a successful join with a gateway, would be for the member node to choose the cluster-head fewest hops away from a gateway. An approach that provides a balance of the above approaches may result in the most efficient selection. The member node informs the affiliated cluster-head and other neighbor nodes of its selection via the node status field contained in future beacon status messages it transmits.

Gateway Join Process

The gateway-join process starts when the join-gateway timer expires and either the neighbor of the CFM node is a gateway or the CFM node is a cluster-head. The join process triggers subsequent attempts to join the selected gateway. Four major processes are performed in support of the join gateway process: JOIN-REQUEST transmission; JOIN-REQUEST reception; JOIN-ACK transmission; and, JOIN-ACK reception. Details with respect to each of these processes is described in conjunction with FIGS. 8 through 10.

JOIN-REQUEST Transmission

Figure 8A:
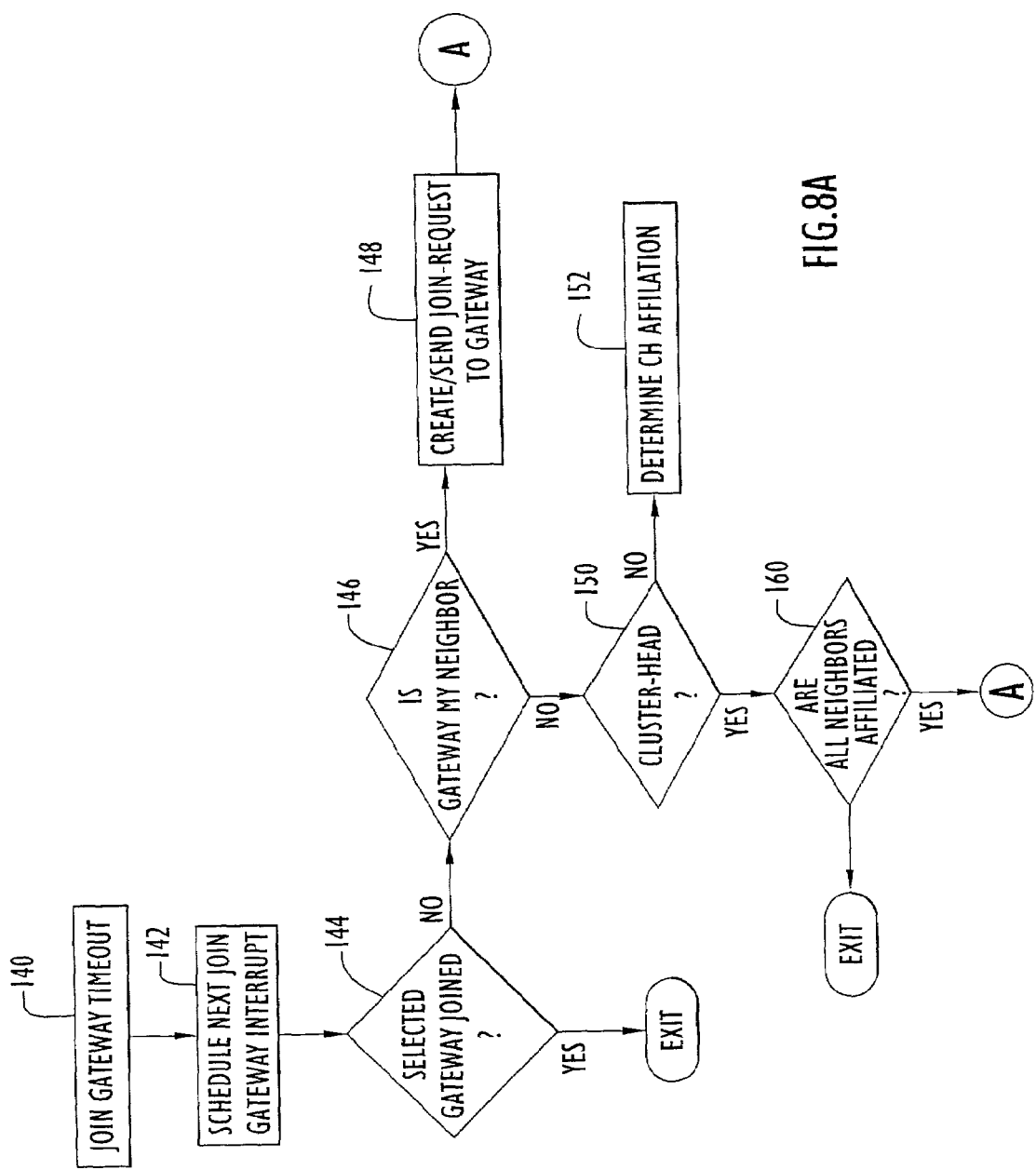
FIGS. 8A–C present a flowchart illustrating an embodiment of a representative CFM technique by which a CFM cluster-head schedules and executes a CFM JOIN-REQUEST process with its selected gateway.

As depicted in FIG. 8A, a CFM node, upon expiration of a predetermined join gateway timeout value 140, sets a new join gateway timer 142 and checks its internally stored node status information to determine whether it has already been successful in joining the selected gateway 144. If so, the process is complete. Otherwise, if the gateway is the CFM node's one-hop neighbor 146, a join request is sent out immediately 148 (see connector A where the create/send join request process is shown in detail in FIG. 8B). This is the case whether the CFM node is a cluster-head or a member node. If the gateway is not the CFM node's one-hop neighbor 146, then only a cluster-head can send out a join-request. If the selected gateway is not a neighbor 146, the CFM node determines if it is a cluster-head. If the CFM node is not a cluster-head, but rather, a member node 150, the member node proceeds with the gateway affiliation process 152, which is shown in greater detail in FIG. 7. If, in operation 146 the CFM node determines that the selected gateway is not a neighbor 146, and the CFM node determines that it is a cluster-head 150, the cluster-head checks to determine if all of its neighbors have completed their respective cluster head affiliation processes 160. If not, the node exits the process. If so, the process continues, following connector A to FIG. 8B. Referring to FIG. 8B, beginning at connector A the CFM node determines whether any of its neighboring cluster-head nodes have a path to the gateway 164. If it does have such a path the cluster-head will create and transmit a join-request message 166 addressed to the selected gateway and it will disable the join gateway timer 168. In case the join request fails to reach its intended destination, the cluster-head node saves the original JOIN-REQUEST message 170, sets a retransmission timer 171, and proceeds to wait either for receipt of a JOIN-ACK message or the occurrence of a join gateway retransmission timeout 172.

Figure 8C:
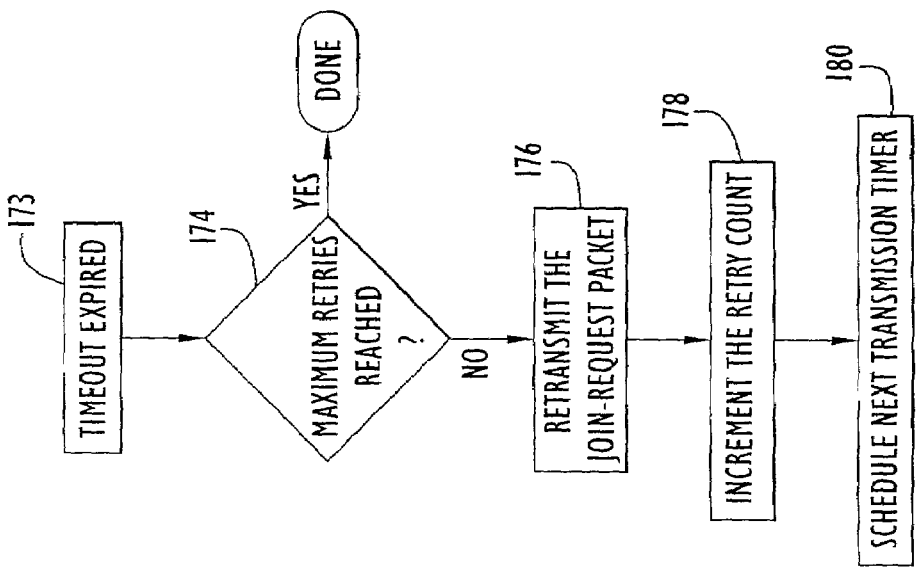
Figure 8B:
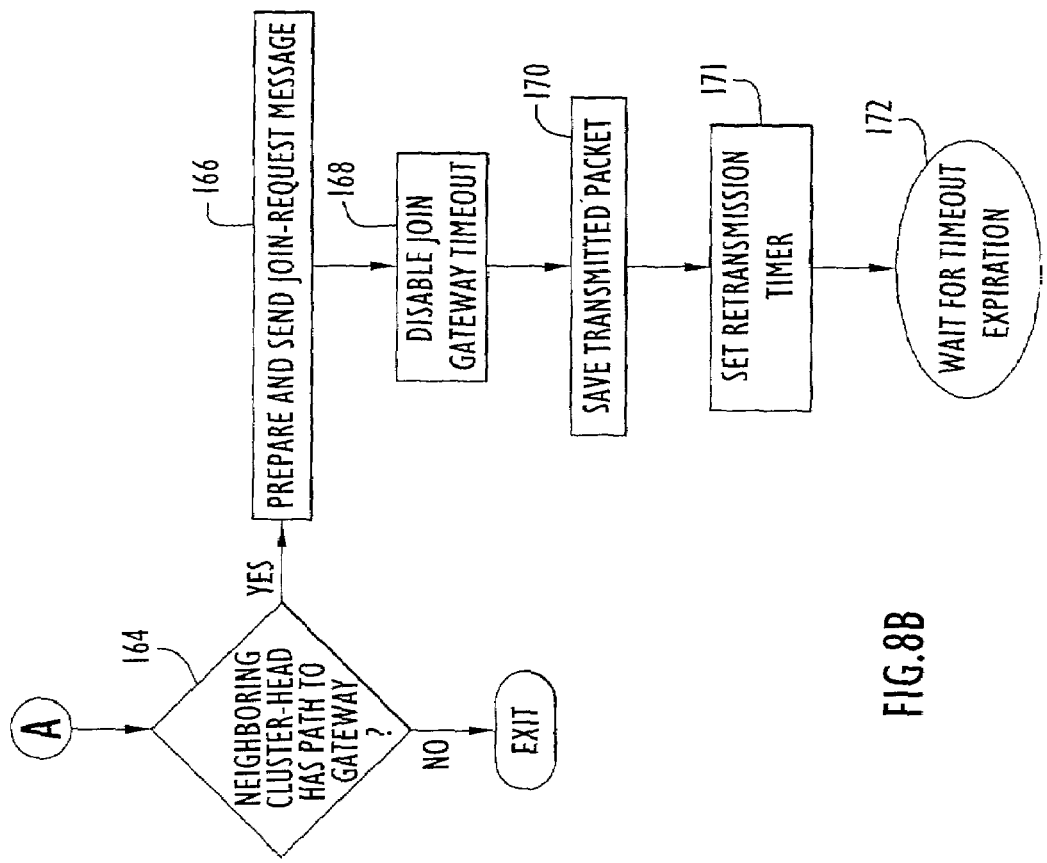

If a join gateway retransmission timeout is received prior to receipt of a JOIN-ACK signal, as shown in operation 173 of FIG. 8C, the cluster-head determines if a dynamically selected maximum retry count (R) has been reached 174. If so, the join request process has failed and the process completes. Otherwise, the cluster-head retransmits the saved JOIN-REQUEST message 176, increments the retry count 178, and sets a new join gateway retransmission timer 180.

The JOIN-REQUEST message can include a message sequence number, the originating cluster-head node's unique identifier, the cluster member list, the identifier and multicast group list for each cluster member, a selected gateway destination identifier and a hop count field. The hop count is incremented by each receiving cluster-head through which the JOIN-REQUEST is passed en-route to the designated gateway node, thus providing a hop count from the cluster-head to its selected gateway. Assuming that the neighboring cluster-head is H hops away from the gateway. The timeout period is estimated as follows:

$$T = 2 * F * D_{one-hop} * (H+1) \qquad (1)$$

where F is a numeric multiplier and D is the one-hop delay. In other words, the timeout is proportional to the round-trip delay. The factor of 2 in equation (1) accounts for the round trip delay. The one-hop delay is easily measured from the reception of a link layer acknowledgement.

JOIN-REQUEST Reception

Figure 9:
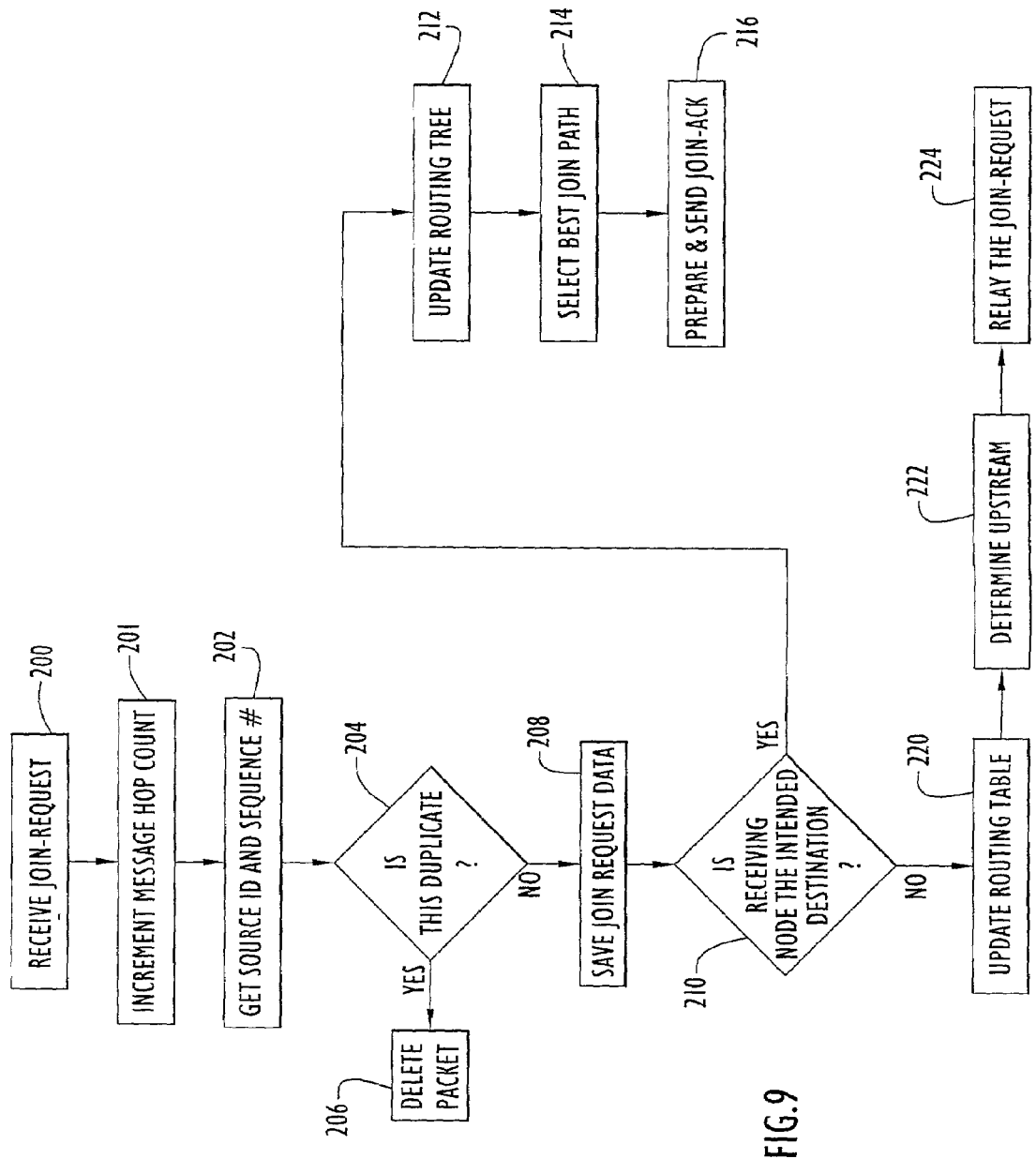
FIG. 9 presents a flowchart illustrating an embodiment of a representative CFM technique by which a CFM gateway node receives and processes a JOIN-REQUEST from a CFM cluster-head node.

FIG. 9 presents a block diagram of JOIN-REQUEST reception by either a cluster-head or a gateway node. If a node receives a JOIN-REQUEST message 200, the message hop count is incremented 201 and the message source identifier and sequence number in the message 202 are used to determine whether the message is a duplicate of a previously received message 204. If the message is found to be a duplicate, the message is deleted 206. If the message is not a duplicate, the receiving node saves the message sequence number, source identifier (ancestor), originator and the originating node's cluster-member list, member multicast group list, and hop count, contained in the JOIN-REQUEST message 208. If the receiving node's source identifier matches the JOIN-REQUEST's designated destination 210, the message has reached its intended gateway node. The gateway node updates its CFM routing table 212 to include the originating cluster-head node and each of its affiliated cluster members, and their respective multicast group lists, as well as the hop count to the originator. Next, the gateway node uses the originator identifier contained within the JOIN-REQUEST message as the basis for searching its updated CFM router table to select the best path between the gateway and the originating cluster-head 214. Finally, the gateway node prepares and transmits a JOIN-ACK message, containing the selected best path between the gateway and the originating cluster-head, back to the cluster-head source transmitting the JOIN-REQUEST message 216.

If the source identifier of the cluster-head node receiving the JOIN-REQUEST does not match the destination identifier 210, the message has not reached it's intended gateway node. The receiving cluster-head node updates its CFM routing table 220 to include the originator and each of the originator's cluster members. Because the receiving cluster-head always has a path to the gateway, the next hop 222 (upstream node) is determined. However, if the upstream node is no longer a neighbor, another cluster-head that has a path to the gateway is selected as the new next hop 222. The join-request is then relayed to the next hop towards its destination 224.

JOIN-ACK Reception

Figure 10:
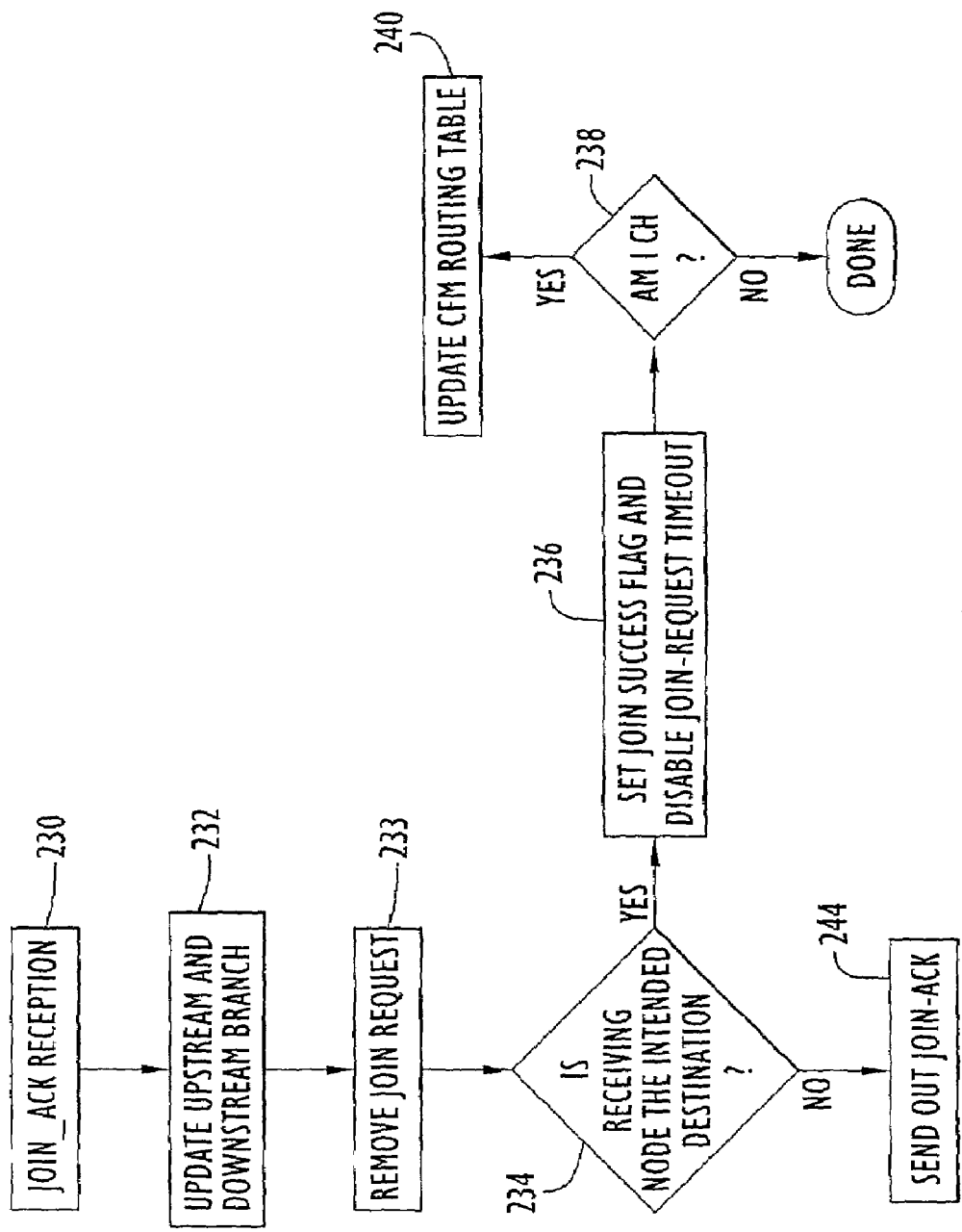
FIG. 10 presents a flowchart illustrating an embodiment of a representative CFM technique by which a CFM cluster-head receives and processes a JOIN-ACK message from its selected gateway.

FIG. 10 presents a block diagram of a process for receiving a JOIN-ACK message by either a destination or en-route cluster-head. Upon reception of the JOIN-ACK message 230, the receiving node updates its upstream and downstream branches 232 and removes previously stored join-request information from memory 233. The upstream branch is the CFM node that transmitted the JOIN-ACK message to the receiving node. The down stream branch is the ancestor CFM node that transmitted to the receiving node the original join-request message that the receiving node previously stored and retransmitted en route to the gateway node.

If the receiving node's source identifier matches the JOIN-ACK destination identifier 234, the message has reached its intended destination. The receiving node will, therefore, update its node status to reflect a successful gateway join and disable the join request timer previously set 236. If the destination node is a cluster-head 238, the cluster-head node will then update its routing table for its cluster members and the cluster members are added as downstream branches 240. If the destination node is not a cluster-head, the process exits. If the receiving node's source identifier does not match the JOIN-ACK destination identifier 234, the JOIN-ACK message has not reached its intended destination. The receiving node will retransmit the received JOIN-ACK message 244 to its downstream node.

Multicast/Unicast Forwarding

In addition to introducing new techniques and structures for building and maintaining a dynamic, ad-hoc, mobile network, as described above, CFM introduces new techniques for routing both unicast and multicast traffic across the newly defined CFM network.

As previously described in relation to FIG. 2B, each CFM communication node processor includes a multicast/unicast message forwarder 26 that forwards both multicast and unicast traffic. The CFM multicast/unicast message forwarder, coordinates transmission and receipt of unicast and multicast level messages to/from the CFM communication node in accordance with CFM unicast and multicast forwarding strategies and techniques described herein. As depicted in FIG. 2B, the CFM multicast/unicast message forwarder 26 serves as an interface between the message multiplexor 24 and traffic source unit 27 and traffic destination unit 28 supported by the communication node.

CFM Multicast/Unicast Message Forwarder

Figure 11:
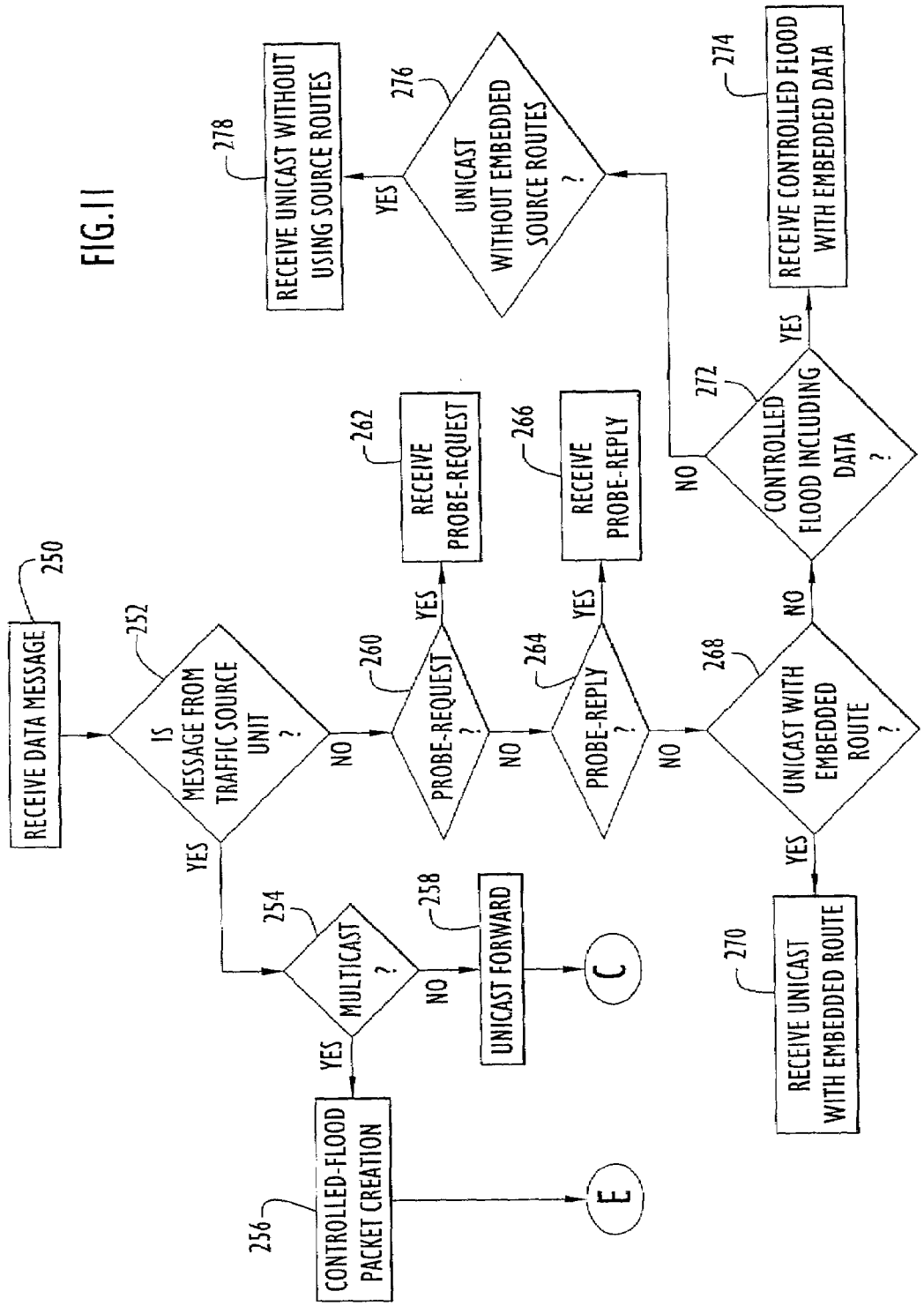
FIG. 11 presents a flowchart illustrating an embodiment of a representative CFM technique by which a CFM node receives and processes incoming CFM messages.

FIG. 11 is a block diagram depicting message reception processing by the CFM multicast/unicast message forwarder. When a data message is received 250, the data message is checked to determine whether it was sent by from a traffic source unit or from the node link layer 252. If the message was received from a traffic source unit, it will be one of two message types: unicast or multicast 254. A multicast message originating from the local CFM node is sent using a controlled flood technique 256. (See discussion in relation to FIG. 16, below.) A unicast message originating from the local CFM node is sent using unicast techniques 258, so long as the CFM node can determine the next hop towards its final destination, otherwise it is sent using controlled flood. (See discussion in relation to FIG. 19, below.) As an alternative to the use of controlled flooding techniques in the process described above, conventional flooding techniques can be used.

If the message is not received from a traffic source unit, it must have been received from the link layer 252, the message could be any one of five different message types: PROBE-REQUEST 260; PROBE-REPLY 264; unicast with embedded source routes 270; controlled flood with embedded data 274; and ordinary unicast 276 (i.e., a unicast message without embedded source routes). If the message is a PROBE-REQUEST 260 or a PROBE-REPLY 264, it will be received and processed as such at operations 262 and 266, respectively. If the message is found to be a unicast message with an embedded route 268 it will be received and processed as such 270. If not a unicast with embedded route message 268, the message will be reviewed to determine whether it is a controlled flood message with embedded data 272, and if so, the messages will be received and processed as such 274, otherwise, if the message is an ordinary unicast message, it will be identified as such 276, and received and processed 278, as shown.

Prior to describing these types of messages and how they are processed, however, it is necessary to introduce a new message routing technique referred to as CFM controlled flood.

Principles of CFM Controlled Flood

A controlled flood technique is used to route messages under the following three circumstances. First, controlled flood is used to route all multicast messages. Given that multicast messages are distributed from a single source and received by multiple destinations, a routing technique capable of efficiently distributing a message to all nodes in the network is preferable over unicast techniques which are designed to efficiently route a message from a single source to a single destination. Second, controlled flood is used to route unicast messages from nodes which, based upon a review of the node's internally stored neighbor sets, routing tables, and link cache, are unable to determine the next hop for the message. Nodes that receive a unicast message via controlled flood will attempt to retransmit the message using ordinary unicast (i.e., next hop unicast), if the node is able to determine an appropriate next hop. The third use for controlled flood is to route PROBE-REQUEST messages, used to discover routes to a designated destination node of a unicast message carrying large amounts of data. In this manner, the direct path from the source to the destination can be determined in advance and the large unicast message can be sent using unicast (with embedded source route data) rather than using a controlled flood with embedded data directly.

Figure 12:
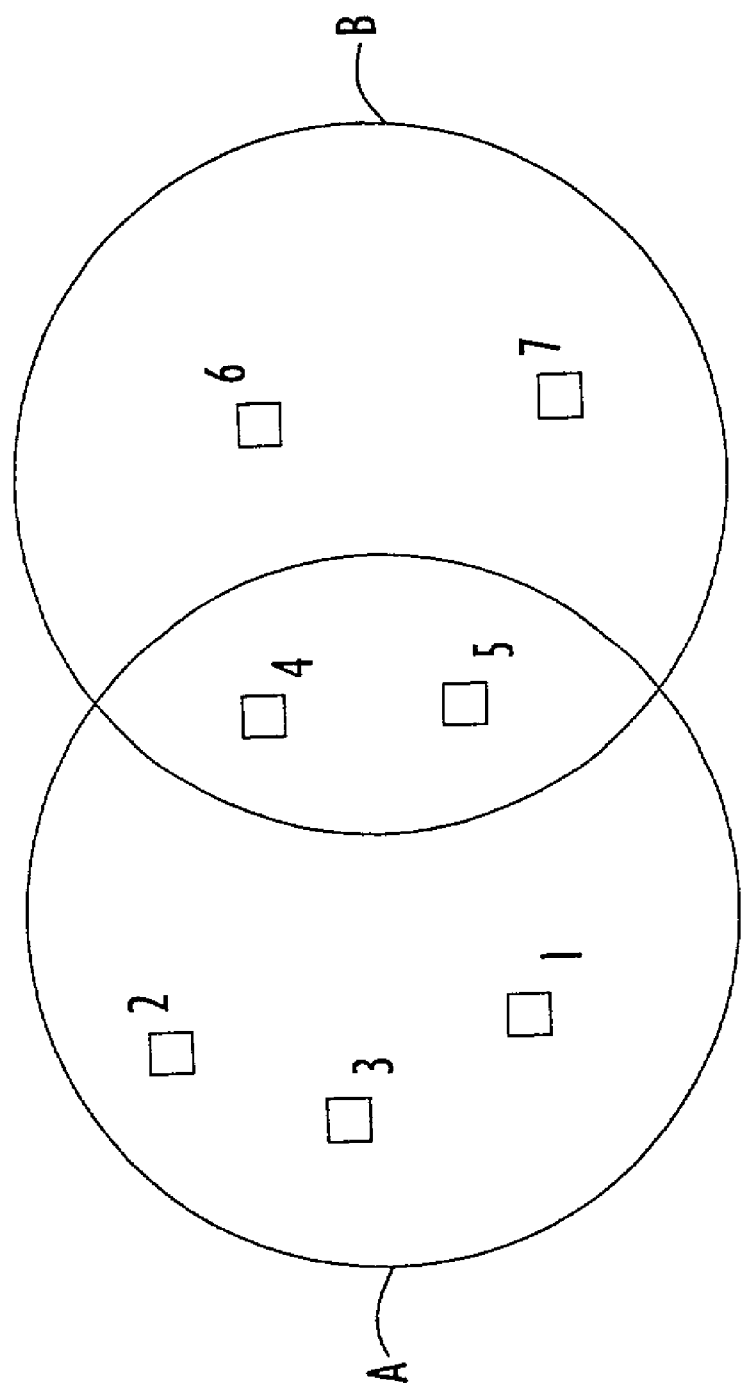
FIG. 12 presents a Venn diagram illustrating a representative embodiment of CFM network topology from a controlled flood perspective.

FIG. 12 illustrates the concept of controlled flood. All the nodes within circle A are within broadcast range of each other, and all nodes within circle B are within broadcast range of each other. The neighbor set of every node in FIG. 12 is set forth in Table 1. In the CFM

TABLE 1

| S1 = {1, 2, 3, 4, 5} | S2 = {1, 2, 3, 4, 5} | S3 = {1, 2, 3, 4, 5} | S4 = {1, 2, 3, 4, 5, 6, 7} |
|---|---|---|---|
| S5 = {1, 2, 3, 4, 5, 6, 7} | S6 = {4, 5, 6, 7} | S7 = {4, 5, 6, 7} | | node environment depicted by FIG. 12, assume that node 1 broadcasts a message that is received by nodes 2, 3, 4 and 5. Using message flooding techniques in which no controls on flooding are imposed, nodes 2, 3, 4 and 5 will all flood again. However, this is not an efficient use of bandwidth or node processing power because all neighbors to which nodes 2 and 3 would broadcast have already received the message via the first broadcast by node 1. Therefore, node 2 and node 3 do not need to flood, and should not. With respect to nodes 4 and node 5, however, each has two neighbors, 6 and 7, that are outside the radio broadcast range of node 1. Therefore, if complete coverage of the network is to be achieved, either node 4 or node 5 must re-flood. A preferred method for determining which of nodes 4 and 5 is to flood is for the node with the smallest index to retransmit the message. Other methods to determine which node is to flood can be used, as well. For example, if the respective node neighbor sets include strength of transmission path indicators, the node with the strongest transmission path to node 6 and node 7 can be selected to flood.

CFM controlled flood is a technique for performing a controlled flood, based upon network topology information maintained by each of the respective CFM communication nodes. When faced with the decision as to whether a node should retransmit a flooded message, a CFM node will search the topology information maintained in its internally stored CFM neighbor set and make a decision as to whether it should flood based upon a two phase rule set. By determining whether to flood a message at the time that the message is actually forwarded, a CFM node is able to base its decision on the most up-to-date network topology information available. Therefore, CFM node message forwarding decisions are able to reflect the CFM network's instantaneously changing topology.

In the first phase, the CFM node determines if it has the potential to flood. If the CFM node determines that it has the potential to flood, it proceeds with the second phase of determining whether it must flood in order for the network to achieve full broadcast coverage.

Phase I can be achieved using the following three part algorithm:

(A) Node k has potential to flood if no node m can be located within node k's internally stored neighbor set such that $S_k \subset S_m$, where $S_k$ is the neighbor set of node k and $S_m$ is the neighbor set of node m. (Note: "$S_k \subset S_m$" is read "$S_k$ is a subset of $S_m$")

(B) Node k does not have to flood if a node m exists such that $S_k \subset S_m$ (C) If there are L nodes with the same neighbor set, then the node with the smallest index floods.

Figure 13:
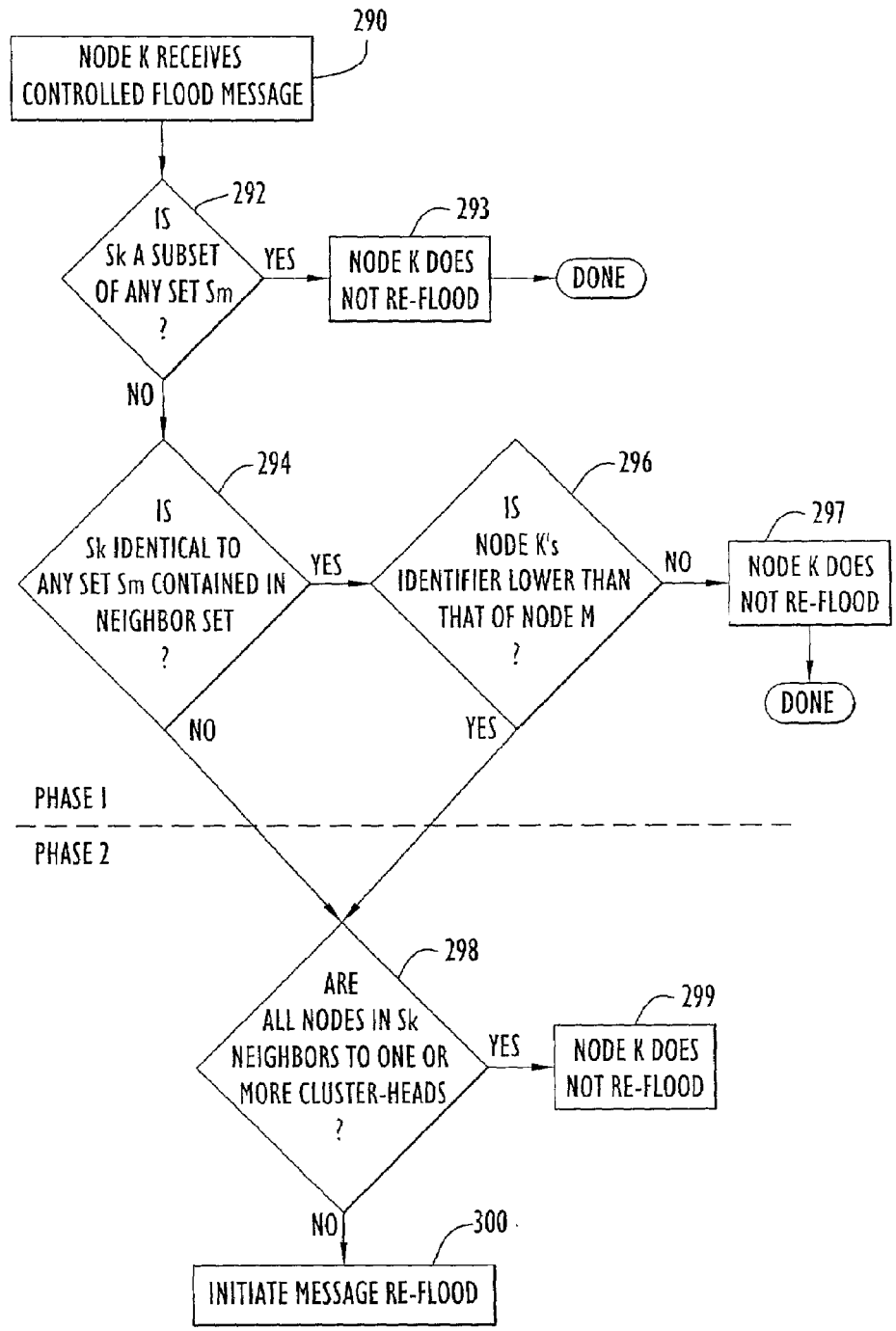
FIG. 13 presents a flowchart illustrating an embodiment of a representative CFM technique by which a CFM node autonomously determines whether it must re-flood a CFM controlled flood message.

As depicted in FIG. 13, assume, by way of exemplary embodiment, that a CFM node, K, with a set of neighbors $S_k$, has received a controlled flood message and must determine whether it should re-flood 290. Based upon the above Phase I algorithm, node K reviews its internally stored neighbor set and determines whether it has a neighbor M, with a set of neighbors $S_m$, that includes all of node K's neighbors 292. If such a node M can be found within K's neighbor set, then $S_k$ is a subset of $S_m$ and, based upon the above algorithm, node K has no potential to re-flood 293, and processing stops, because any node that would have received the message from node K will receive the message if node M floods. If, however, no such node M can be located 292, K has the potential to re-flood and additional analysis must be performed. Further, if a node M is found with identical member nodes as node K, 294, one of the nodes must be selected as having a potential to re-flood and additional analysis must be performed. Under such circumstances, the node with the lowest sequence identifier could be selected 296 as the node with potential to flood. The node without the lowest identifier would, therefore, have no potential to flood 297, and processing would stop with respect to that node.

If a CFM node decides, based upon Phase I, that it has no potential to flood, the analysis is complete, as indicated above, and there is no need to proceed with Phase II. However, if a node decides that it has potential to flood, Phase II analysis must be performed to determine whether the node is an articulation point (i.e., whether the node is the sole source of message broadcasts to one or more nodes). An articulation point is a node that is used for forwarding the packet. For example, consider three nodes such that, S1= (1,2), S2=(1,2,3) and S3=(2,3). Without node 2, node 1 can not send packet to node 3 and node 3 can not send packet to node 1. Therefore, node 2 is an articulation point because it is the only node to reach both node 1 and node 3.

In Phase II, a decision is made whether a node with the potential to flood must, in fact, flood. If the neighbors of node K can be divided into several subparts in which the nodes within each subpart are neighbors to a cluster-head or gateway node, node K does not need to flood. The dynamically driven member/cluster-head decision process presented in association with FIG. 5, assures that each cluster-head has a unique neighbor set topology. Therefore, the nodes within each of K's neighbor subsets will receive the message when each of the respective cluster-heads flood.

To comply with Phase II of this analysis, a node k searches through the list of neighbors associated with cluster-head nodes listed in its internally stored neighbor set. If each subset of node k's neighbors are also neighbors of one or more cluster-head nodes 298, node k does not re-flood the message 299. In other words, even if node k has potential to flood, it still does not flood the message if it is not an articulation point, as determined by the Phase II analysis presented above. If, on the other hand, each subset of node k's neighbors are not neighbors of one or more cluster-head nodes, node k will re-flood the message 300.

The following algorithm, presented below, is a simplified manner for implementing Phase II of the CFM controlled flood decision making process. Simulations indicate that the algorithm provides excellent performance in support of controlled flood decision making in a CFM network:

a) For any $S_m$, $m \neq k$, find the number of elements that belong to both $S_m$ and $S_k$. Let $C_m$ be that number.

b) Compute the percentage $P_m = C_m/N_k$, where $N_k$ is the number of elements of $S_k$.

c) Find q such that $P_q = \max(P_m)$ for all m and $m \neq k$.

d) If $P_q > 0.85$ and $0 < d_q < 3$ where $d_q = N_q - N_k$ and node q is a cluster-head, then node k is not an articulation point.

In other words, even of node k has potential to forward, it still does not forward if it is not an articulation point. A node could have several neighbors that are forwarding nodes. If all these forwarding nodes flood at the same time there are strong possibilities of collisions. To reduce collisions, a random delay could be imposed before each forwarding node transmits the message.

Now that the proposed uses of controlled flood in a CFM network have been introduced, and technical aspects of the controlled flood technique have been presented, a proper foundation has been laid to support a discussion of the decision processes related to controlled flood message transmission/reception by a CFM communication node.

Transmission and Reception of Controlled Flood with Embedded Data

Figure 14:
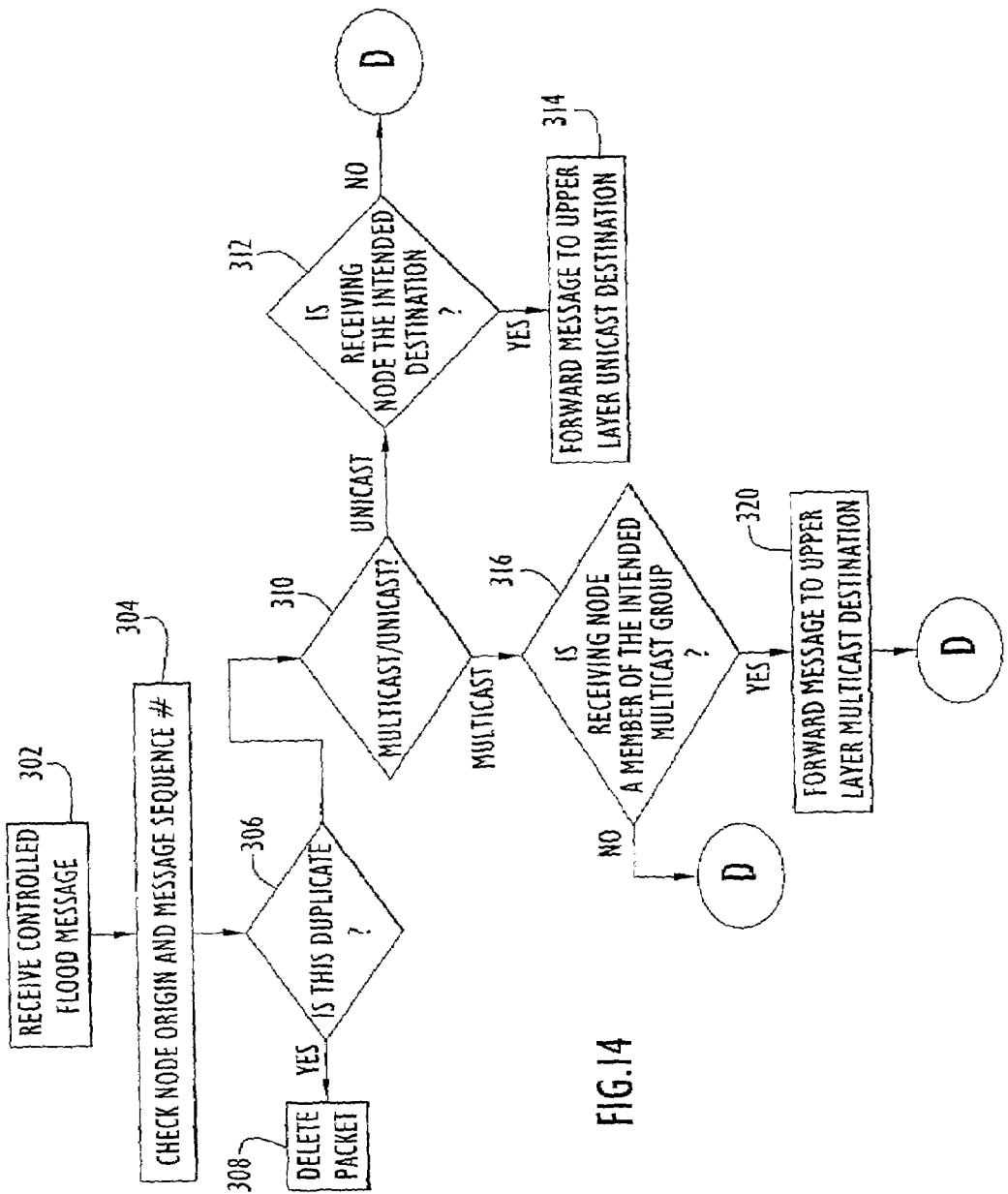
FIG. 14 presents a flowchart illustrating an embodiment of a representative CFM technique by which a CFM node receives a CFM controlled flood message.

FIG. 14 presents a block diagram describing the reception and processing of controlled flood messages by a CFM communication node. The process depicted in FIG. 14 applies to multicast data messages and unicast data messages transmitted using controlled flood. Controlled flood is used to transmit multicast messages, to transmit unicast messages for which a transmitting node is unable to determine the next hop towards the unicast message's designated destination, and if size of the unicast message exceeds a dynamically configurable threshold, controlled flood is used to issue a PROBE-REQUEST in order to determine a direct path to the unicast message's designated destination. Details with respect to sending a PROBE-REQUEST message using controlled flood are described later in relation to FIG. 16.

As shown in FIG. 14, upon receipt of a controlled flood message 302, the CFM node checks the message node origin identifier and the message sequence number 304 to determine whether the message is a duplicate 306. If it is a duplicate, the message is deleted 308. If it is not a duplicate the message is processed along separate paths, depending upon whether it is a multicast or unicast signal 310. If the message is a unicast message and the receiving node's unique identifier matches the intended destination of the received message 312, the unicast message is forwarded to the intended unicast traffic destination unit residing on the communication node 314. If the message is a multicast message and the receiving node is a member of the multicast group to which the message belongs 316, the multicast message is forwarded to the intended multicast traffic destination unit residing on the communication node 320. If the receiving node is not the intended unicast recipient 312, not a member of the designated multicast group 316, or is a member of the designated multicast group 320, the node proceeds to the CFM re-flood decision processing (connector D), addressed in relation to FIG. 15, below.

Figure 15:
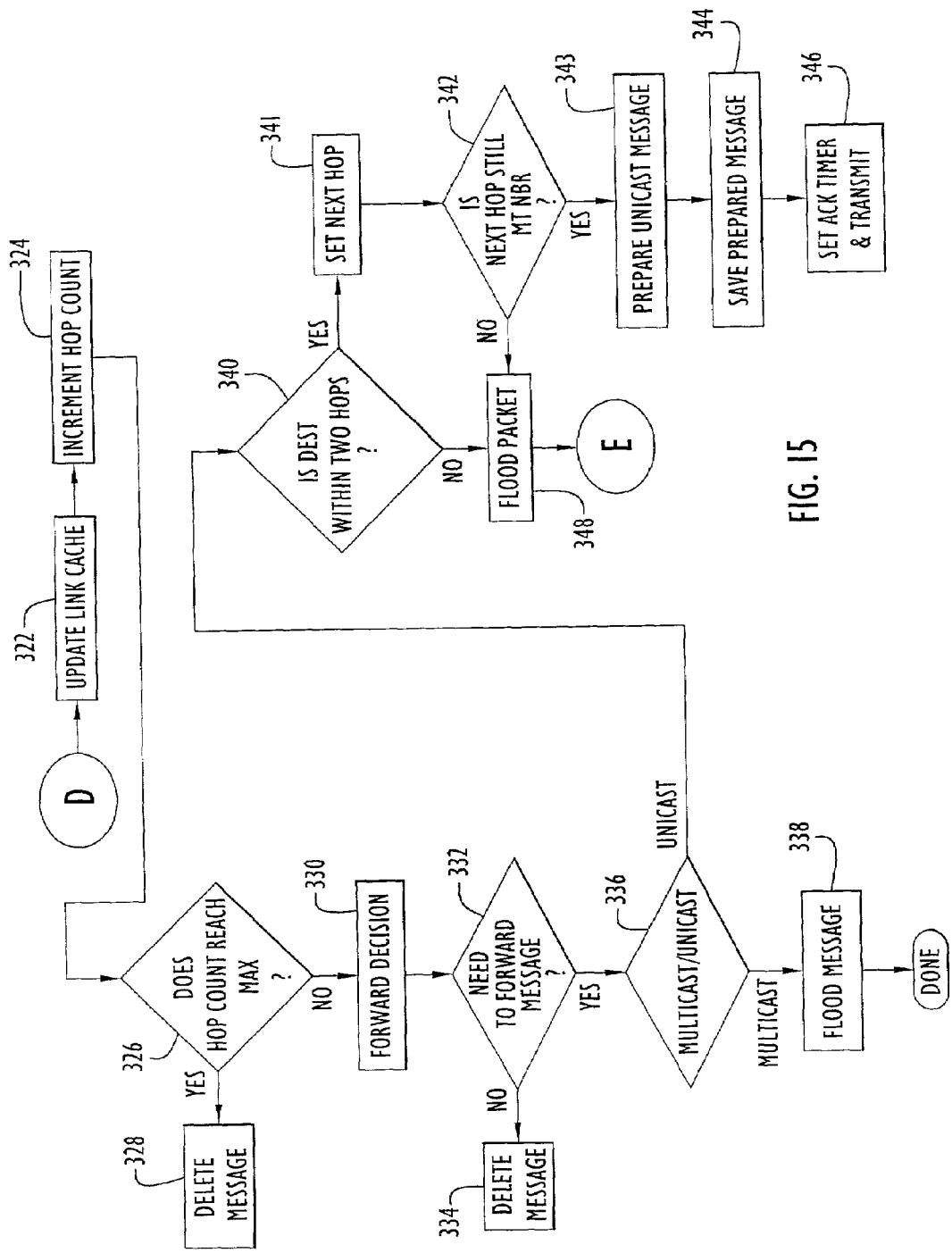
FIG. 15 presents a flowchart illustrating an embodiment of a representative CFM technique by which a CFM node processes a CFM controlled flood message.

As shown in FIG. 15, the first operation performed in the CFM re-flood decision process is to update the receiving CFM node's link cache using relay list information contained in the received controlled flood message 322. The relay list contained within each controlled flood message identifies, for each node through which the message passed, the parent node from which the message was received, and the child node to which the received message was rebroadcast. To update its link cache the CFM node will search the relay list for a relay not contained within the receiving CFM node's link cache. If such a relay is found, the identifier for the relay node, along with identifiers for its parent and child nodes are added to the receiving node's link cache. If an identifier for a relay node is already in the cache, the parent is checked to determine whether a link to the old parent exceeds a dynamically configured link age, as measured in elapsed seconds from the time the link is first recorded in the cache. If so, the relay is linked to the new parent. If the age is not exceeded, but the link cost to the receiving node is smaller through the new parent, the parent branch is also updated. Link cost, in this example, may be measured in terms of the number of hops to the receiving node, however, other parameters could also be used, depending upon the goal. For example, a stored measure of the strength of the signal supporting a link could be assessed in determining overall link cost in a network environment in which links are prone to high failure rates due to CFM node mobility.

Further, if an existing cached relay node is assigned a new parent, the link to the old parent is removed. Next, the child is checked. If an identifier for the child is not in the cache, an identifier for the child is added. If an identifier for the child is already in the cache, the identifier for the child is affiliated with the new parent only if the link from the child to the old parent exceeds the link age or the link cost through the new parent is smaller than the link cost through the old parent. Further, if the child is affiliated with the new parent, the same child is unaffiliated, or removed, from the old parent.

Next, the CFM node begins its analysis to determine whether it will re-flood the message. First, the message hop count is incremented 324, and if the hop count has reached a dynamically configured max hop count 326, the packet is destroyed 328, otherwise, processing proceeds. Next, the CFM node determines whether it must re-flood the message 330, using the process described in relation to FIG. 13. If the node is not required to flood the message 332, the message is deleted 334. If the message must be forwarded 332 and it is a multicast message 336, the message is flooded 338 and the reception process is complete. If the message must be forwarded 332 and is a unicast message 336, the CFM node will search its internal routing information based upon the final intended destination of the received message. If the next hop is within two hops 340 and the next hop determined 341 is still the CFM node's neighbor 342, the message is prepared for retransmission as a unicast message 343, the prepared package is saved 344 in case the unicast transmission should fail, a unicast ACK link timer is set and the message is retransmitted using next hop unicast techniques 346. The ACK link timeout is processed as would an ordinary unicast link timeout, as described later in association with FIG. 18B. If the next hop cannot be located 342, the message is retransmitted using controlled flood 348, as described later in relation to FIG. 16.

As described above, these controlled flood techniques are primarily used for multicast messages, but can also be used to transmit unicast messages if the transmitting node is unable determine a path to the designated destination. If, however, the size of the unicast message exceeds a dynamically configurable threshold, a CFM node preferably will not flood the unicast message, for doing so could impose significant unnecessary burden upon the network. Instead, the CFM node will transmit, using controlled flood techniques, a PROBE-REQUEST message to determine an optimal direct path to the unicast message's designated destination. As an alternative to the use of controlled flooding techniques in the process described above, conventional flooding techniques can be used.

PROBE-REQUEST AND PROBE-REPLY
Messages

Figure 16:
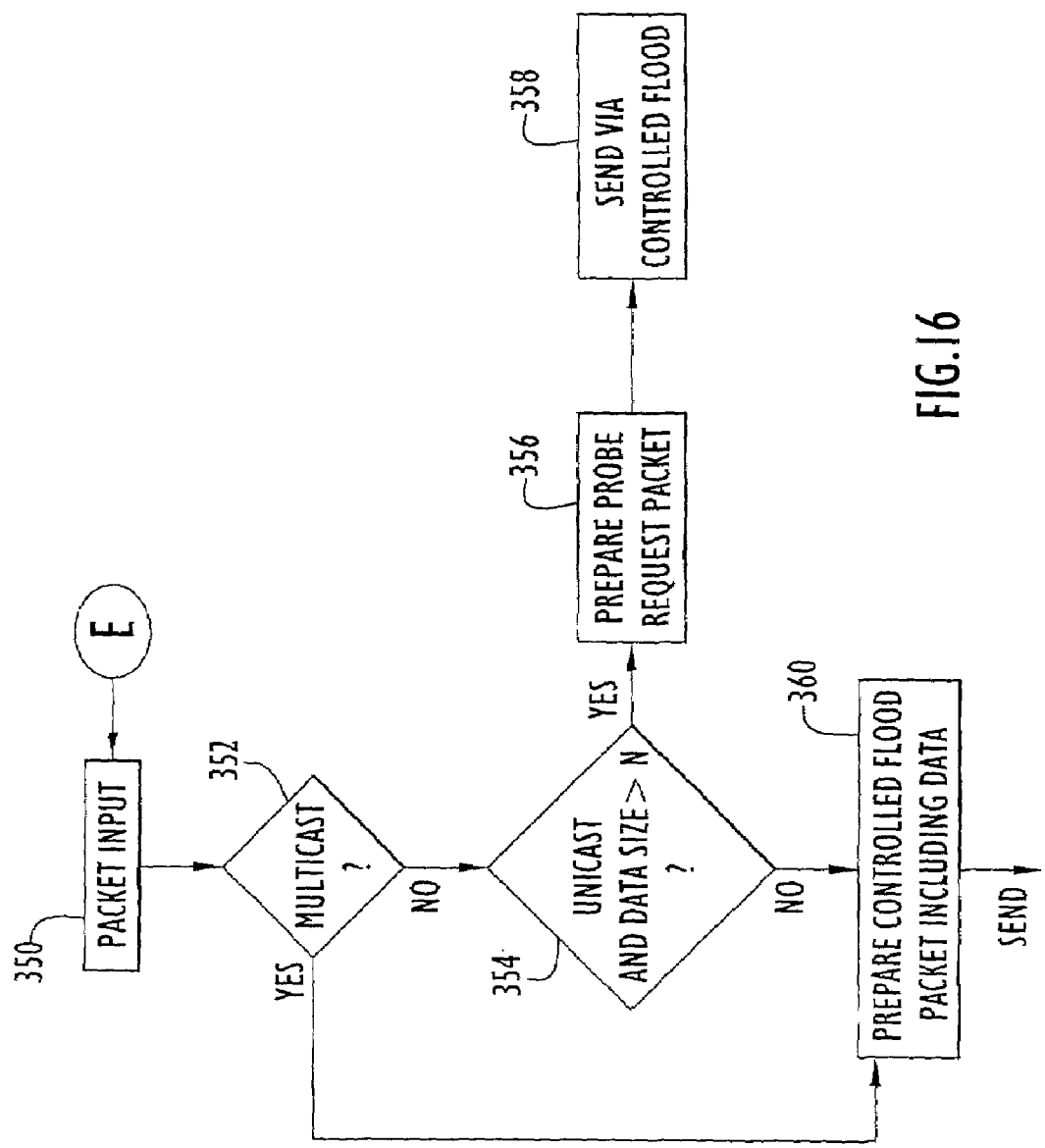
FIG. 16 presents a flowchart illustrating an embodiment of a representative CFM technique for issuing a controlled flood message or, alternatively, initiating a PROBE-REQUEST message to discover a route to a unicast destination.

FIG. 16 presents a continuation of multicast message processing described earlier in the discussion relating to FIG. 11 (operation 256) or the controlled flood message transmission depicted in FIG. 15 (operation 348). As depicted in FIG. 16, upon receipt of a message from an internal traffic source unit 350, the CFM node multicast/unicast message forwarder will first determine whether the message is a multicast message 352. If the message is a multicast message, it will be prepared for transmission via controlled flood 360. If the message is a unicast message for which no next hop can be determined 352, its size is checked to determine whether it exceeds a dynamically established CFM transmission size constraint 354.

If the message does not exceed the size constraint, it is transmitted via controlled flood techniques 360, as described above. If the message does exceed the size constraint, a probe request message is prepared 356 and transmitted via controlled flood 358. Both controlled flood and probe-request messages include a sequence number, origin, hop count, and the list of relays along the path. However, controlled flood messages includes data, while probe-request messages do not. As an alternative to the use of controlled flooding techniques in the process described above, conventional flooding techniques can be used.

The dynamic CFM transmission size constraint may be tailored to a network based upon the network's internally defined segment size. If a message to be transmitted over a network has a size greater that the network's internally defined segment size, the message is subdivided and sent across the network in multiple segments. By setting the dynamic CFM transmission size constraint to a size larger than the network's internally defined segment size, the dynamic CFM transmission size constraint can be appropriately scaled to different networks and avoid introducing network overhead associated with unnecessary probe request sequences.

Referring now to FIG. 17, a controlled flood PROBE-REQUEST message is likely to be received 362 by numerous intermediate nodes while en route to its designated destination. Consistent with the description of controlled flood forwarding described in relation to FIG. 15, a PROBE-REQUEST message received via controlled flood can be retransmitted by a receiving CFM node using either a controlled flood or unicast technique, depending upon whether the receiving CFM node can determine a unicast next hop. Likewise, as described in relation to FIG. 19, below, a PROBE-REQUEST message received via unicast can be retransmitted by a receiving CFM node using either controlled flood messages or a unicast message, depending upon whether the receiving CFM node can determine the unicast next hop. Whether received via controlled flood or unicast, however, the relay list is stored 364 and used to update the receiving node's link cache information in a manner similar to that described in relation to FIG. 15. Furthermore, the relay list information contained within the PROBE-REQUEST message is updated with the identity of the receiving node. If a PROBE-REQUEST is received and the receiving node is the destination 366, a unicast with embedded route PROBE-REPLY is sent back to the source 370 containing the relay list information collected within the PROBE-REQUEST message en-route to the destination node. If a unicast PROBE-REQUEST is received and the receiving node is not the designated destination 366, the PROBE-REQUEST is retransmitted 368 using unicast techniques described in relation to FIGS. 18A–18B, below. If a controlled flood PROBE-REQUEST is received, and the receiving node is not the designated destination 366, the decision to retransmit 368 is based upon the controlled flood decision process described in relation to FIG. 15.

Upon receiving the PROBE-REPLY message 372, a CFM node will cache the relay list contained within that message 374 and refresh its link cache as described in relation to FIG. 15. If the receiving node is the designated destination 376, the originally stored message is retrieved from storage 378, and a unicast message with embedded source routing, containing the retrieved original message is prepared and transmitted 380 using the relay list returned in the PROBE-REPLY message. If the receiving node is not the designated destination 376, the PROBE-REPLY is retransmitted 390 using unicast techniques described in relation to FIGS. 18A and 18B, below.

Transmission and Reception of CFM UNICAST Messages

Unicast messages differ from multicast messages in that a unicast message is routed to only a single destination node. As such, a unicast message is most efficiently transmitted in a very controlled hop-by-hop manner towards its designated destination. Such an approach requires that the respective nodes receiving a unicast message have sufficient knowledge of the surrounding network topology to make intelligent decisions with respect to the next-hop routing of a received message.

As previously described, based upon a CFM node's neighbor set alone, every CFM node whether it serves as a member node, cluster-head node, or gateway node has access to, at any given time, the most accurate information available with respect to nodes within two hops. Furthermore, messages distributed using CFM controlled flood techniques carry, within the message itself, a relay list containing the identity of each CFM node through which the message has passed. This relay list information is searched by receiving CFM nodes and used to refresh their internally maintained link cache. If a member node is unable to locate a designated destination within its neighbor set or link cache, it may route the message to its affiliated cluster-head, which has access to an internally maintained routing table with information about all nodes within two hops. If a cluster-head node is unable to identify the next hop based upon its neighbor set, routing table or stored cache, it may route the message to its gateway cluster-head, which has access to an internally maintained routing table, or gateway tree, with information from all cluster-head nodes that have successfully joined the gateway.

The CFM techniques described here are well suited to a dynamically mobile, wireless, ad-hoc network for they are very efficient with respect to the maintenance of cluster-head and gateway routing tables. CFM nodes are each capable of autonomous network configuration/reconfiguration decisions based upon their local topology information. This allows the CFM network topology to adapt rapidly to change and allows work associated with building and maintaining the CFM network infrastructure to be efficiently distributed across the respective CFM nodes. Furthermore, although routing information with respect to a distant destination may contain inaccuracies, each node can autonomously adapt to accommodate such inaccuracy. In addition, the closer a message gets to its final destination, routing errors due to propagation delays are less likely to occur. If required, the beacon refresh rate can be dynamically adjusted on a node by node basis in response to an individual node's rate of mobility.

In a CFM network, when a CFM node attempts to route a unicast message, it will attempt to route the message using the most reliable information available to it. First in reliability is CFM neighbor set information, for it is received directly by the CFM node, on a regularly scheduled basis, with negligible propagation delay. Next in reliability are routing tables maintained by cluster-head and gateway nodes, for they are updated on a regular basis, and suffer from only slight propagation delays associated with the join request process. Third in reliability is the stored cache information, for although link cache information is highly accurate upon receipt, it is maintained via the unscheduled receipt of relay list information contained in received messages, and many of the links may grow old. Should a CFM node fail to determine a next hop via the above tiered information sources, it will resort to forwarding the message to its CFM upstream path. For example, a CFM member node, upon failing to determine a next hop via its neighbor set and link cache, will forward the message to its affiliated cluster-head. A CFM cluster-head, upon failing to determine a next hop via its neighbor set, routing table, and link cache, will forward the message to its selected gateway. Upon selection of a next hop base upon any of these sources, the selected node is validated against the transmitting node's neighbor set. If the selected node is no longer a neighbor, the message is routed via controlled flood.

A CFM unicast message preferably includes, in addition to other information, a unique originating node identifier, a sequence number, a unique destination node identifier, a relay list, and a hop count. The originating node identifier and message sequence number are used by receiving nodes to determine whether a received message is a duplicate. The unique destination node identifier allows a receiving node to determine whether the message has reached its final destination, and if not, provides the basis for determining the next hop along the route. The relay list provides receiving nodes with path information by which to update their respective link caches, and allows a transmitting node to designate a next hop. In unicast messages with embedded source routing, the originating node uses the list of relays to explicitly specify each relay hop from the source node to the designated destination node. If the next hop cannot be determined for a unicast message, it is transmitted using controlled flood techniques described in relation to FIG. 15. Should that be necessary, the relay list and hop count information are used to record and share route information with receiving nodes and to determine when the controlled flood message should be deleted for having exceeded a maximum number of allowed hops.

Figure 18A:
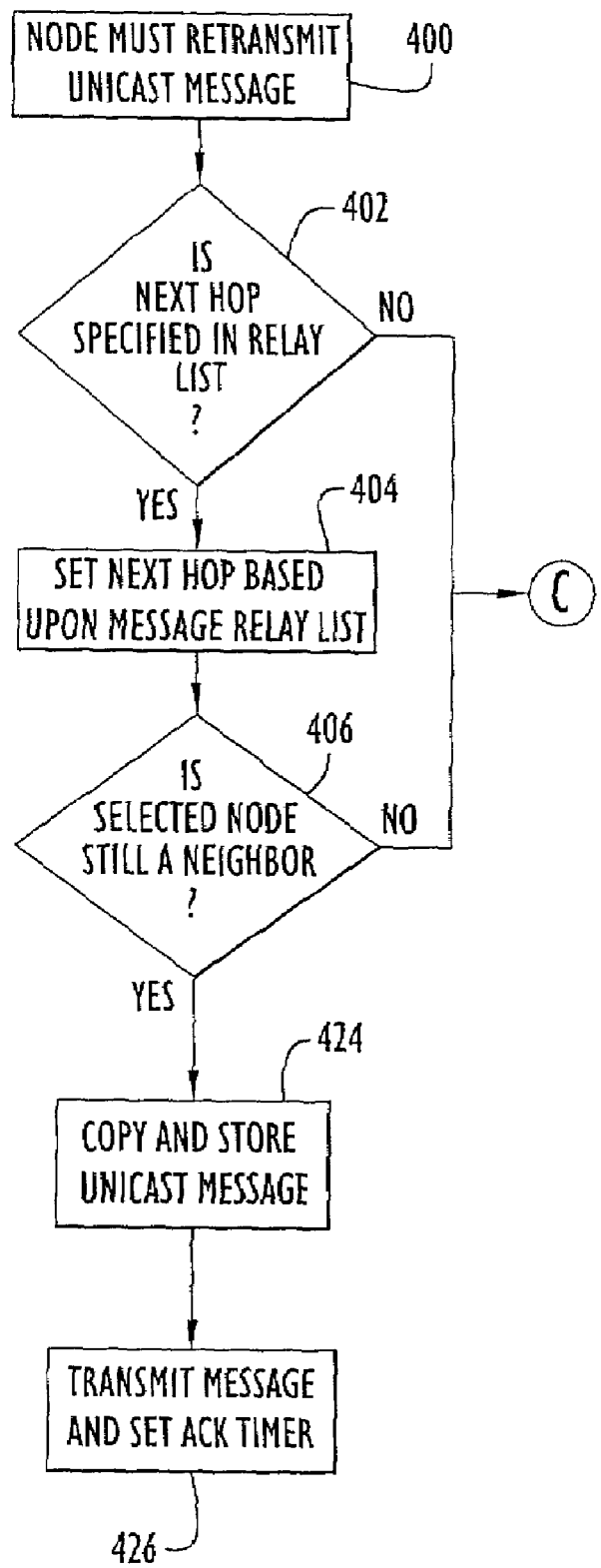
FIGS. 18A–B present a flowchart illustrating an embodiment of a representative CFM technique for forwarding CFM unicast messages.

As depicted in FIG. 18A, upon determining that it must retransmit a unicast message 400, a CFM node will review the list of relays contained in the message to determine whether the message is a unicast message with an embedded source route in which a next hop has already been designated 402. If so, the next hop is set to the next node following the identity of the present node in the relay list 404, the selected node is validated against the transmitting node's neighbor set to confirm that it is still a neighbor 406, the unicast message is copied and stored to protect against transmission failure 424, the message is transmitted, and an acknowledgement timer set 426. If the next hop is not specified in the relay list or the next hop is no longer a neighbor, the process continues as described below in relation to FIG. 19.

As indicated in FIG. 18A, if a unicast message is to be transmitted, the unicast message is copied and stored to protect against transmission failure 424, and an acknowledgement timer set 426. The ACK timeout period is proportional to the round trip propagation time between the transmitting node and the designated next hop. Mathematically, the ACK timeout period can be computed as follows:

$$T_i = \alpha T_{i-1} + (1 - \alpha)(\beta D_{round\sim\sim\sim trip}) \quad (2)$$

where $\beta$ is a constant multiplier and $\alpha$ is a coefficient between 0 and 1. If a link ACK is received in time, the stored unicast message is identified and removed from memory.

Figure 18B:
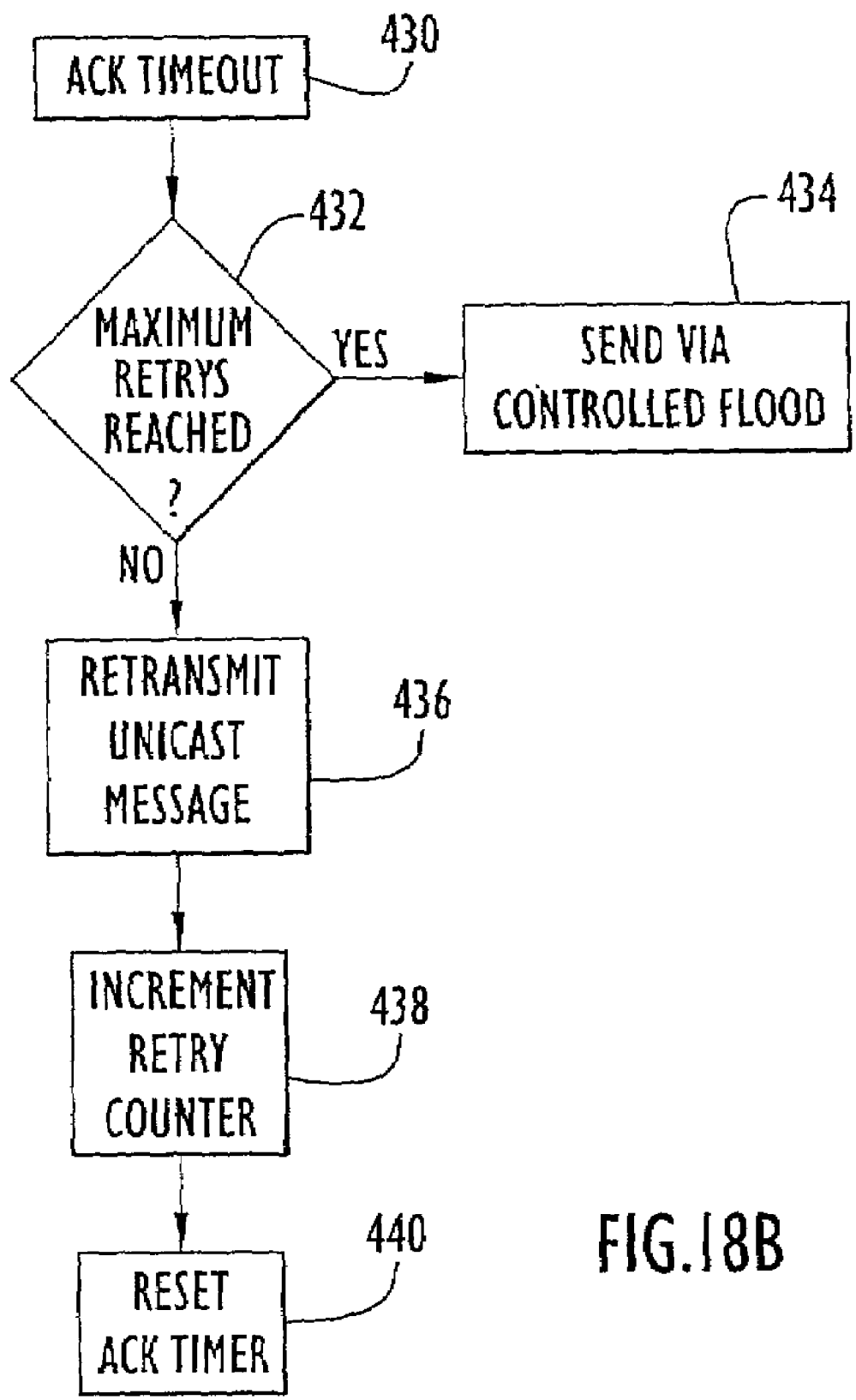

As depicted in FIG. 18B, however, if the link ACK is not received within the timeout period 430, and a maximum retry count has not been exceeded 432, the node will retransmit the unicast message 436, increment the retry counter 438 and reset the ACK timer 440. If the link ACK is not received within the timeout period 430 and the maximum retry count has been exceeded, the message is retransmitted via controlled flood 434 and the stored unicast message is removed from memory.

When a node receives a unicast message, it first determines whether the message is a duplicate by comparing the message sequence number and originating node identifier against a list containing similar information from previously received messages. If the received message is not a duplicate and the designated destination matches the identifier of the receiving node, the message is forwarded to a unicast traffic destination unit in the receiving CFM node. If the designated destination does not match the identifier of the receiving node, the receiving CFM node is merely a designated hop and the message should be forwarded, as described above. Finally, if the received message is a duplicate, it is destroyed.

Figure 19:
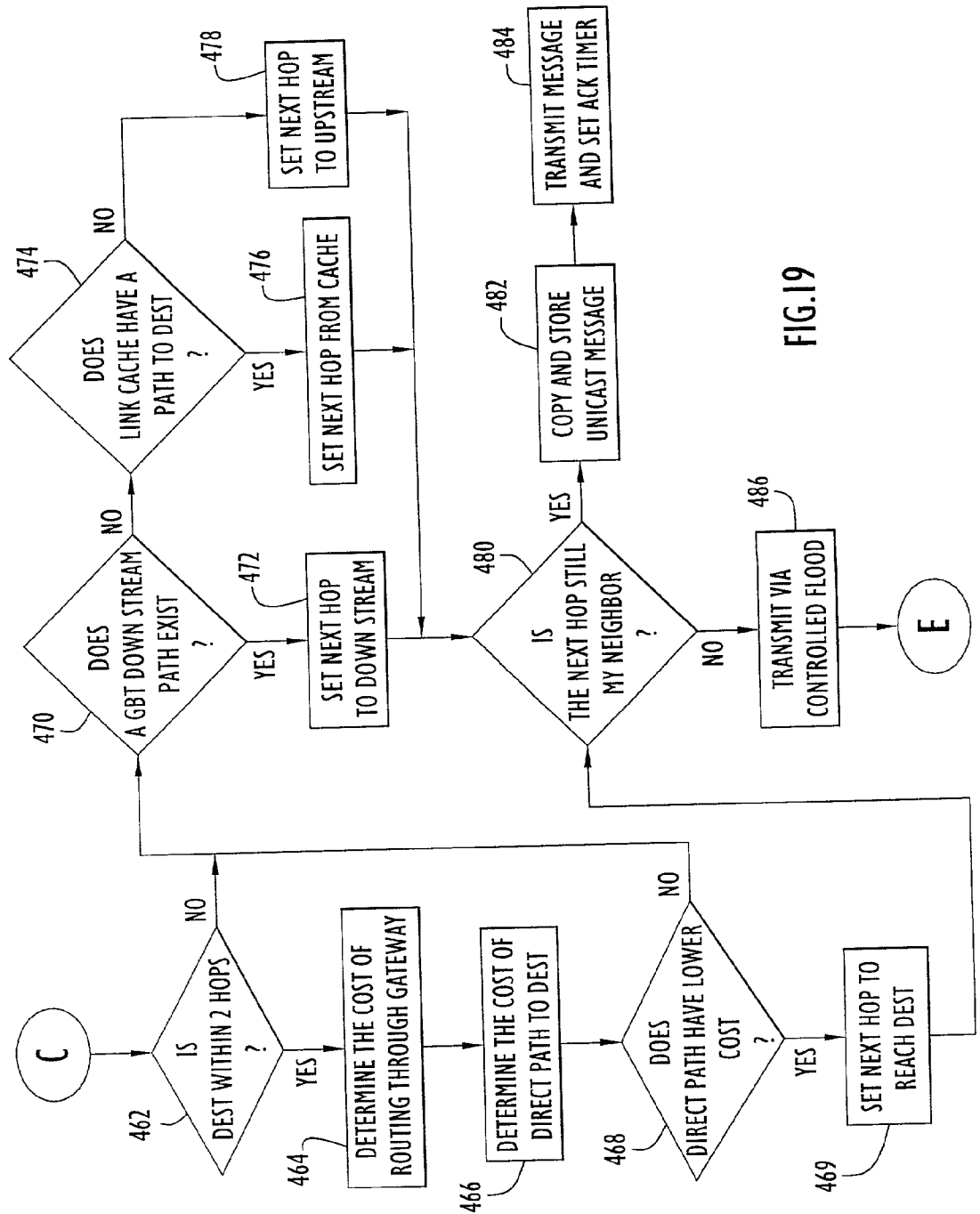
FIG. 19 presents a flowchart illustrating an embodiment of a representative CFM technique for forwarding a unicast message from an originating CFM node.

FIG. 19 presents the process for routing and transmitting unicast messages without using source routes. As depicted in FIG. 19, the CFM node will first check its internal neighbor set to determine whether the destination is within two hops 462. If the destination is within two hops, the CFM node will determine the cost of routing the message through the CFM gateway node 464 and determine the cost of routing the message directly 466. If the direct path has a lower cost 468, the next hop is set based upon the direct path route 469. If the selected node is still an active neighbor 480, the unicast message is copied and stored to protect against transmission failure 482, the message is transmitted and an acknowledgement timer set 484, otherwise the message is transmitted via controlled flood 486.

If the designated destination is not within two hops 462 or the direct path is not a lower cost route 468, the node's router table is searched for a down-stream path to the designated destination 470. If a path can be found, the next hop is set based upon the down-stream path 472, and the selected node is validated against the nodes neighbor set to assure that it is still a neighbor 480. If the selected node is still an active neighbor 480, the unicast message is copied and stored to protect against transmission failure 482, the message is transmitted and an acknowledgement timer set 484, otherwise the message is transmitted via controlled flood 486.

If upon failing to find a less costly route to the destination node within two hops and failing to find a path in the down-stream path 470, the transmitting CFM node searches its link cache information for a path to the designated destination 474. If a path can be found, the next hop is set based upon the link cache information 476, and the selected node is validated against the node's neighbor set to assure that it is still a neighbor 480. If the selected node is still an active neighbor 480, the unicast message is copied and stored to protect against transmission failure 482, the message is transmitted and an acknowledgement timer set 484, otherwise the message is transmitted via controlled flood 486.

If upon failing to find a less costly route to the destination node within two hops, failing to find a path in the down-stream path 470, and failing to locate a path via the link cache 474, the transmitting CFM node will designate its upstream cluster-head or gateway node as the next hop 478. If the selected node is still an active neighbor 480, the unicast message is copied and stored to protect against transmission failure 482, the message is transmitted and an acknowledgement timer set 484, otherwise the message is transmitted via controlled flood 486. As an alternative to the use of controlled flooding techniques in the processes described above, conventional flooding techniques can be used.

Application to Hierarchical Network Architectures

As described above, CFM techniques encompass many highly efficient techniques for building and maintaining network infrastructure used to route both unicast and multicast messages in dynamically mobile, wireless, ad-hoc networks. These effective techniques for the collection, distribution, and maintenance of network topology information throughout the network, and its use of autonomous CFM communication nodes, allows a CFM network configuration to adapt readily to topology changes and allows message routing to be performed in the most distributed and efficient manner possible. Although a CFM system uses cluster formation and gateway selection/join techniques, the CFM routing architecture is relatively flat. Furthermore, the CFM techniques described here can be easily integrated with a conventional multi-tier network.

By way of non-limiting example, a physical network of CFM nodes can be logically separated into any number of logical islands by assigning an "island group" identifier to each CFM node. In such a logically segmented network, if a transmitting node is assigned to island K, and a beacon update or flooded message originates from an island other than K, the transmission is simply ignored on the basis of an island identifier mismatch. In this manner, the CFM topology based island network K, will be logically isolated from other islands, though potentially physically overlapping with the other islands.

If a CFM node sends a message to a different island, the gateway in each island takes the responsibility for inter-island forwarding. First, the source node sends a message to the gateway of the source island using the techniques described here. The source gateway then forwards the message to the gateway of the destination island. The destination gateway, in turn, forwards the messages to the desired destination using the CFM techniques described here, using its own island identifier. In this manner, a large network can be subdivided into any number of CFM islands, upon which any number of conventional network tiers can be layered.

Having described the above preferred embodiments of controlled flood techniques for efficiently creating and maintaining a dynamically mobile, wireless, ad-hoc network capable of routing both unicast and multicast messages, it is believed that other modifications, variations and changes will be suggested to those skilled in the art in view of the teachings set forth herein. The on-demand multicast and unicast techniques for establishing routes and transferring information between nodes in ad-hoc data communication networks are not limited to any specific network or network protocol. The approaches described may be easily employed in many different networks and networking environments. It is therefore to be understood that all such variations, modifications and changes are believed to fall within the scope of the present invention as defined by the appended claims. Although specific terms are employed herein, they are used in their ordinary and accustomed manner only, unless expressly defined differently herein, and not for purposes of limitation.

What is claimed is:

1. A method of broadcasting a message in a wireless communication network having a plurality of communication units including a receiving communication unit having stored therein network topology information including information identifying neighboring communication units forming a first tier of neighbors and information identifying neighboring communication units of the first tier of neighbors forming a second tier of neighbors, the method comprising:

receiving the message at the receiving communication unit; and determining, based on the network topology information, whether to retransmit the message based on whether the neighbors of the receiving communication unit are also neighbors of another one of the plurality of communication units.

2. The method of claim 1, wherein said determining whether to retransmit the message comprises determining not to retransmit the message if another communication unit among the plurality of communication units is configured to broadcast messages to a set of communication units that includes the first tier neighbors of the receiving communication unit and at least one other communication unit that is not a neighbor of the receiving communication unit.

3. The method of claim 1, wherein said network topology information includes status information indicating whether the first tier communication units serve as one of a member, a cluster-head, and a gateway unit; and wherein the receiving communication unit determines that no communication unit identified within the network topology vinformation is configured to transmit a message to a superset of communication units that includes the first tier neighbors of the receiving communication unit and at least one other communication unit that is not a neighbor of the receiving communication unit, the method further comprising:

determining if the receiving communication unit is an articulation point; and retransmitting the message if the receiving communication unit is determined to be an articulation point.

4. The method of claim 3, wherein the receiving communication unit is determined to be an articulation point if the first tier neighbors of the receiving communication unit cannot be divided into subsets such that the members of each subset are first tier neighbors to one of a cluster-head and a gateway communication unit.

5. The method of claim 3, wherein $N_k$ is a number of neighbor communications units to which the receiving communication unit is configured to transmit a message; and wherein said determining whether the receiving communication node is an articulation point comprises:

identifying for a neighbor of the receiving communication unit the number of communication units $C_m$ to which the receiving communication unit and the neighbor communication unit can both transmit messages;

calculating for said neighbor of the receiving communication unit a percentage $P_q=C_m/N_k$ of the receiving communication unit's neighbors to which a neighbor communication unit can transmit a message;

determining if the percentage $P_q$ for said neighbor is a maximum value from amongst the neighbors of the receiving communication unit;

calculating a difference $d_q$ between a total number of neighbors of a communication unit having a maximum value of $P_q$ and a total number of the receiving communication unit's neighbors $N_k$;

wherein the receiving communication unit is determined not to be an articulation point if $P_q$ of the receiving communication unit is greater than 85% and $0<d_q<3$ and said node having a maximum value of $P_q$ is one of a cluster-head and gateway communication unit.

6. The method of claim 1, wherein said determining whether to retransmit includes using a predetermined algorithm to determine if one or more communication units identified within the network topology information are configured to broadcast a message to each of the receiving communication unit's first tier neighbors and no communication unit identified within the network topology information is configured to broadcast a message to a set of communication units that includes each of the receiving communication unit's first tier neighbors and at least one other communication unit that is not a neighbor of the receiving communication unit.

7. The method of claim 6, wherein a plurality of communication units are each connected to one or more communication links, and the predetermined algorithm determines whether the receiving communication unit is connected to a greatest number of links with a quality exceeding a threshold from among said one or more communication units configured to broadcast a message to each of the receiving communication unit's first tier neighbors.

8. The method of claim 6, wherein the predetermined algorithm determines if the receiving communication unit has a fewest number of hops to a gateway unit from among said one or more communication units configured to broadcast a message to each of the receiving communication units first tier neighbors.

9. The method of claim 6, wherein each of the plurality of communication units has a unique identifier and the predetermined algorithm determines to retransmit the message based upon communication unit unique identifiers.

10. The method of claim 9, wherein the predetermined algorithm determines to retransmit the message if the receiving communication unit has a smallest unique unit identifier among the communication units configured to broadcast a message to each of the receiving communication unit's first tier neighbors.

11. The method of claim 9, wherein the predetermined algorithm determines to retransmit the message if the receiving communication unit has a largest unique unit identifier among the communication units configured to broadcast a message to each of the receiving communication unit's first tier neighbors.

12. The method of claim 1, wherein a group of communication units among the plurality of communication units is assigned a cluster identifier and the receiving communication unit is assigned a cluster head identifier, wherein the receiving communication unit transmits the message to the group of communication units if the cluster identifier has an affiliation with the cluster head identifier.

13. A method of transmitting a message to a destination communication unit within a wireless communication network having a plurality of communication units including an upper layer communication unit having stored therein routing information for routing to the plurality of communication units in the network, and a receiving communication unit having stored therein network topology information including identifiers of neighboring communication units from which the receiving communication unit has received a message forming a first tier of neighbors, and identifiers of communication units from which the first tier neighbor communication units have received messages forming a second tier of neighbors, the method comprising:

receiving at the receiving communication unit a message destined for a destination communication unit;

determining whether a direct path to the destination communication unit can be identified based on the network topology information stored within the receiving communication unit;

transmitting the message from the receiving communication unit to a next hop communication unit according to the identified path to the destination communication unit if said path is identified, transmitting to an upper layer communication unit if said path can not be identified, and transmitting the message using a flooded message broadcast if said next hop communication unit is determined to no longer be a neighbor of the receiving communication unit.

14. The method of claim 13, wherein the message is transmitted using controlled flood techniques if no path to said destination communication unit is identified and the receiving communication unit is not associated with an upper layer communication unit.

15. The method of claim 13, wherein in determining a path to the destination communication unit, the destination communication unit is determined to be located within a predetermined number of hops from the receiving communication unit.

16. The method of claim 15, wherein the predetermined number of hops is two.

17. The method of claim 13, wherein the message received by the receiving communication unit is received from a traffic source unit internal to the receiving communication unit.

18. The method of claim 13, wherein determining a path to the destination communication unit further includes:

searching a routing table, stored within the receiving communication unit, containing routes to destination communication units.

19. The method of claim 13, wherein determining a path to the destination communication unit further includes:

searching a link cache, stored within the receiving communication unit, containing routes to destination communication units.

20. The method of claim 13, wherein if a direct path is determined based upon network topology information, the cost of routing the message via the direct path is compared with the cost of routing the message through a gateway node, and the next hop communication unit is selected based upon the result of said comparing of routing costs.

21. The method of claim 13, wherein the upper layer communication unit is a cluster-head communication unit.

22. The method of claim 13, wherein the upper layer communication unit is a gateway communication unit.

23. The method of claim 13, wherein receiving communication unit includes an island identifier, and the receiving communication unit detects an island identifier in the message and processes that message only if the island identifier of the message matches the island identifier of the receiving communication unit.

24. The method of claim 13, wherein if the size of the message exceeds a predetermined threshold the receiving communication unit outputs a probe request using a flooded message broadcast to detect a route to the destination node, and the receiving communication unit transmits the message based on the route detected using the probe request.

25. The method of claim 13, wherein if the size of the message exceeds a predetermined threshold the receiving communication unit outputs a probe request using a controlled flood broadcast to detect a route to the destination node, and the receiving communication unit transmits the message based on the route detected using the probe request.

26. The method of claim 13, wherein the message is transmitted using a flooded message broadcast if the transmission to said next hop communication unit fails.

27. The method of claim 13, wherein the message is transmitted using a controlled flood broadcast of the message if the transmission to said next hop communication unit fails.

28. A communication unit suitable for use in a communication network of a plurality of communication units, the communication unit comprising:

a network topology storage unit having stored therein network topology information including identifiers of neighboring communication units forming a first tier of neighbors and neighbor sets identifying neighbors of the first tier neighbors forming a second tier of neighbors; and a message forwarding unit configured to forward a multicast message using a controlled flood broadcast technique and to forward a unicast message to a destination communication unit using a unicast technique if the network topology information stored in the storage unit includes information identifying a next hop in a route between the communication unit and the destination unit and using a controlled flood technique if the next hop is determined to no longer be a neighbor of the communication unit.

29. The communication unit of claim 28, further comprising a dynamic network maintenance module configured to revise the network topology information stored in the storage unit in response to receiving beacon information from a neighboring communication unit.

30. The communication unit of claim 29, wherein the dynamic network maintenance module periodically selects a gateway for routing messages based on the network topology information in the storage unit.

31. The communication unit of claim 30, wherein the communication unit is a radio communication device and the communication network is an ad-hoc network of radio communication devices.

* * * * *